United States Patent
Kusaka

(10) Patent No.: US 8,228,404 B2
(45) Date of Patent: Jul. 24, 2012

(54) IMAGING CORRECTION DEVICE AND IMAGING CORRECTION METHOD

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 577 days.

(21) Appl. No.: 12/285,497

(22) Filed: Oct. 7, 2008

(65) Prior Publication Data

US 2009/0096903 A1 Apr. 16, 2009

Related U.S. Application Data

(60) Provisional application No. 61/064,932, filed on Apr. 3, 2008.

(30) Foreign Application Priority Data

Oct. 10, 2007 (JP) ................................. 2007-264557

(51) Int. Cl.
*H04N 9/64* (2006.01)
*H04N 5/335* (2011.01)
(52) U.S. Cl. ....................................... 348/246; 348/275
(58) Field of Classification Search .................. 348/245, 348/246, 273, 275, 280, 281, 350
See application file for complete search history.

(56) References Cited

U.S. PATENT DOCUMENTS

| | | | | |
|---|---|---|---|---|
| 4,630,307 A * | 12/1986 | Cok | ............................... | 382/165 |
| 5,805,216 A * | 9/1998 | Tabei et al. | ................... | 348/246 |
| 6,404,918 B1 * | 6/2002 | Hel-or et al. | ................... | 382/167 |
| 6,563,537 B1 * | 5/2003 | Kawamura et al. | ........... | 348/252 |
| 6,781,632 B1 | 8/2004 | Ide | | |
| 2006/0132626 A1 | 6/2006 | Sakurai | | |
| 2007/0237429 A1 | 10/2007 | Kusaka | | |
| 2010/0194967 A1 | 8/2010 | Amano | | |

FOREIGN PATENT DOCUMENTS

| | | |
|---|---|---|
| JP | A-2000-305010 | 11/2000 |
| JP | A-2006-180099 | 7/2006 |
| JP | A-2009-069577 | 4/2009 |

OTHER PUBLICATIONS

Mar. 6, 2012 Notification of Reasons for Refusal for JP Application No. 2007-264557 w/translation.

* cited by examiner

*Primary Examiner* — Timothy J Henn
(74) *Attorney, Agent, or Firm* — Oliff & Berridge, PLC

(57) ABSTRACT

An imaging apparatus includes an imaging element having two-dimensionally arranged imaging pixels that receive light of an image transmitted through an optical system and output pixel signals corresponding to the received light, and in which non-imaging pixels that are different from the imaging pixels are arranged. The apparatus detects a direction of continuity of the pixel signals based on pixel signals of the imaging pixels positioned around the non-imaging pixels, and determines, based on the detected direction of continuity, the pixel signals at the positions of the non-imaging pixels by processing the pixel output of the imaging pixels positioned around the non-imaging pixels.

27 Claims, 18 Drawing Sheets

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |
| R06 | G16 | R26 | G36 | R46 | G56 |

FIG. 15

IMAGING CORRECTION DEVICE AND IMAGING CORRECTION METHOD

CROSS-REFERENCE TO RELATED APPLICATION

This non-provisional application claims the benefit of U.S. Provisional Application No. 61/064,932, filed Apr. 3, 2008, the disclosure of which is incorporated herein by reference in its entirety. The disclosure of the following priority application is herein incorporated by reference in its entirety: Japanese Application No. 2007-264557 filed in Japan on Oct. 10, 2007.

BACKGROUND

This invention relates to imaging apparatus and methods.

An imaging apparatus that performs imaging and focus detection by using an image sensor, in which focus detection pixels used in a pupil-division type phase difference detection method are arranged amongst the two-dimensionally-arranged imaging pixels, is known, for example, from Japanese Laid-Open Patent Publication No. 2000-305010. In such an imaging apparatus, data of imaging pixels at positions of the focus detection pixels, that is, the pixel data output from the imaging pixels disposed at the proper positions of the focus detection pixels, is determined by averaging the pixel data of the imaging pixels around the proper focus detection pixels.

However, with the pixel data determined by a pixel compensation process using such averaging, there is a problem in that the image quality decreases as the spatial frequency of the image becomes closer to the Nyquist frequency which is related to an image pitch of the image.

For example, for an image with black-and-white vertical stripes, in which the spatial frequency is equal to the Nyquist frequency, if the pixel data at the positions of the focus detection pixels is compensated by averaging the pixel data of the imaging pixels that are adjacent diagonally in four directions from the focus detection pixels, the white and the black are inversely imaged in the proper data and in the compensated data.

This occurs because, by inserting a focus detection pixel array between the imaging pixel arrays, the pitch of the imaging pixels becomes larger in the proximity of the focus detection pixel array, and accordingly, the Nyquist frequency of the image is changed to a low frequency, thereby reducing the reproducibility of images.

In particular, if the focus detection pixels or defective pixels are arranged linearly, and if an image having a high spatial frequency component exists in the direction perpendicular to the direction of such an arrangement, image deterioration becomes easily visibly noticeable when compensating the pixels by the above-described averaging process.

SUMMARY

An imaging apparatus according to one aspect of the invention includes an imaging element having two-dimensionally arranged imaging pixels that receive light of an image formed by an optical system and output pixel signals, and in which non-imaging pixels, different from the imaging pixels, are arranged amongst the imaging pixels. The imaging apparatus includes a continuity detection portion that detects a direction of continuity of the pixel signals based on the pixel signals of the imaging pixels arranged around the non-imaging pixels, and a calculation portion that determines a pixel signal at a position of the non-imaging pixels by processing the pixel output of the imaging pixels arranged around the non-imaging pixels in response to the detected direction of continuity.

According to some aspects of the invention, the continuity detection portion detects, as the direction of continuity, a direction in which a change in output of the pixel signals by a plurality of imaging pixels in a plurality of directions on the imaging element extending through the non-imaging pixel is smallest.

According to some aspects of the invention, the imaging pixels are arranged such that the imaging pixels of a plurality of types having different spectral characteristics are arranged with different densities based on a certain rule, and the calculation portion performs, by different processes, a calculation of the pixel signals for the non-imaging pixel provided at a position of the imaging pixels arranged at a relatively high density in the imaging pixels of the plurality of types, and a calculation of the pixel signals for the non-imaging pixels provided at a position of the imaging pixels arranged at a relatively low density in the imaging pixels of the plurality of types.

According to some aspects of the invention, the calculation of the pixel signals for the non-imaging pixels provided at the position of the imaging pixels arranged at the relatively high density in the imaging pixels of the plurality of types is a process that averages the pixel signals output from the imaging pixels arranged at the relatively high density around the non-imaging pixels.

According to some aspects of the invention, the calculation of the pixel signals for the non-imaging pixels provided at the position of the imaging pixels at the relatively low density in the imaging pixels of the plurality of types is a process that generates the pixel signals for the non-imaging pixels from a ratio of the pixel signals of the imaging pixels arranged at the relatively high density around the non-imaging pixels and the pixel signals of the imaging pixels arranged at the relatively low density around the non-imaging pixels.

According to some aspects of the invention, the calculation portion performs interpolation based on the pixel signals of the imaging pixels around the non-imaging pixels in a direction perpendicular to a direction of an array of the non-imaging pixels, if the direction of continuity matches with the direction of the array of the non-imaging pixels.

According to some aspects of the invention, the imaging apparatus further includes a presumption portion that presumes the pixel signals at the positions of the non-imaging pixels based on a spectral distribution of incident light in a proximity of the non-imaging pixels, an averaging portion that calculates the pixel signals at the positions of the non-imaging pixels by statistically averaging the pixel signals of the imaging pixels around the non-imaging pixels, and a selection portion that compares the pixel signals calculated by the calculation portion and the pixel signals presumed by the presumption portion based on the pixel signals calculated by the calculation portion and selects as final pixels one of the pixel signals calculated by the calculation portion and the pixel signals presumed by the presumption portion.

According to some aspects of the invention, the imaging apparatus further includes a determination portion that determines whether there is uniformity in the image around the non-imaging pixels, based on the pixel signals of the imaging pixels around the non-imaging pixels, an averaging portion that calculates the pixel signals at the positions of the imaging pixels by statistically averaging the pixel signals of the imaging pixels around the non-imaging pixels, and a decision portion that decides the pixel signals calculated by the averaging portion as the final pixel signals at the position of the non-imaging pixels, if the uniformity is determined by the determination portion.

According to some aspects of the invention, the non-imaging pixels are focus detection pixels that output pixel signals for detecting a focus adjustment state of the optical system. In such an arrangement, the two-dimensional arrangement of the imaging pixels may be a Bayer arrangement of red, green and blue pixels. Furthermore, the focus detection pixels may be arranged in a part of a row or column in which the green and blue pixels are arranged linearly.

In addition, in the imaging apparatus described above, the focus detection pixels are structured from micro lenses and a photoelectric converter. In such an arrangement, the focus detection pixels output focus detection signals in response to a pair of images formed by a pair of luminous fluxes that pass through parts of an exit pupil in the optical system.

Another aspect of the invention relates to an imaging method using an imaging element having two-dimensionally arranged imaging pixels that receive light of an image formed by an optical system and output pixel signals corresponding to the received light, and in which non-imaging pixels, different from the imaging pixels, are arranged amongst the imaging pixels. The method includes determining pixel signals at a position of the non-imaging pixels by detecting a direction of continuity of the pixel signals based on the pixels signals of the imaging elements arranged around the non-imaging pixels, and processing the pixel output of the imaging pixels arranged around the non-imaging pixels in response to the detected direction of continuity.

According to embodiments of the present invention, excellent pixel compensation becomes possible for an image with a high spatial frequency, even with non-imaging pixels, such as the focus detection pixels and defective pixels, in the two-dimensional arrangement of the imaging pixels, thereby allowing for obtaining images with low deterioration.

BRIEF DESCRIPTION OF THE DRAWINGS

FIG. 15 is a figure showing each pixel data by Gij, Bij and Rji when focus detection pixels are arranged in one row within two-dimensionally Bayer-arranged imaging pixels.

DETAILED DESCRIPTION OF EMBODIMENTS

Figure 1:
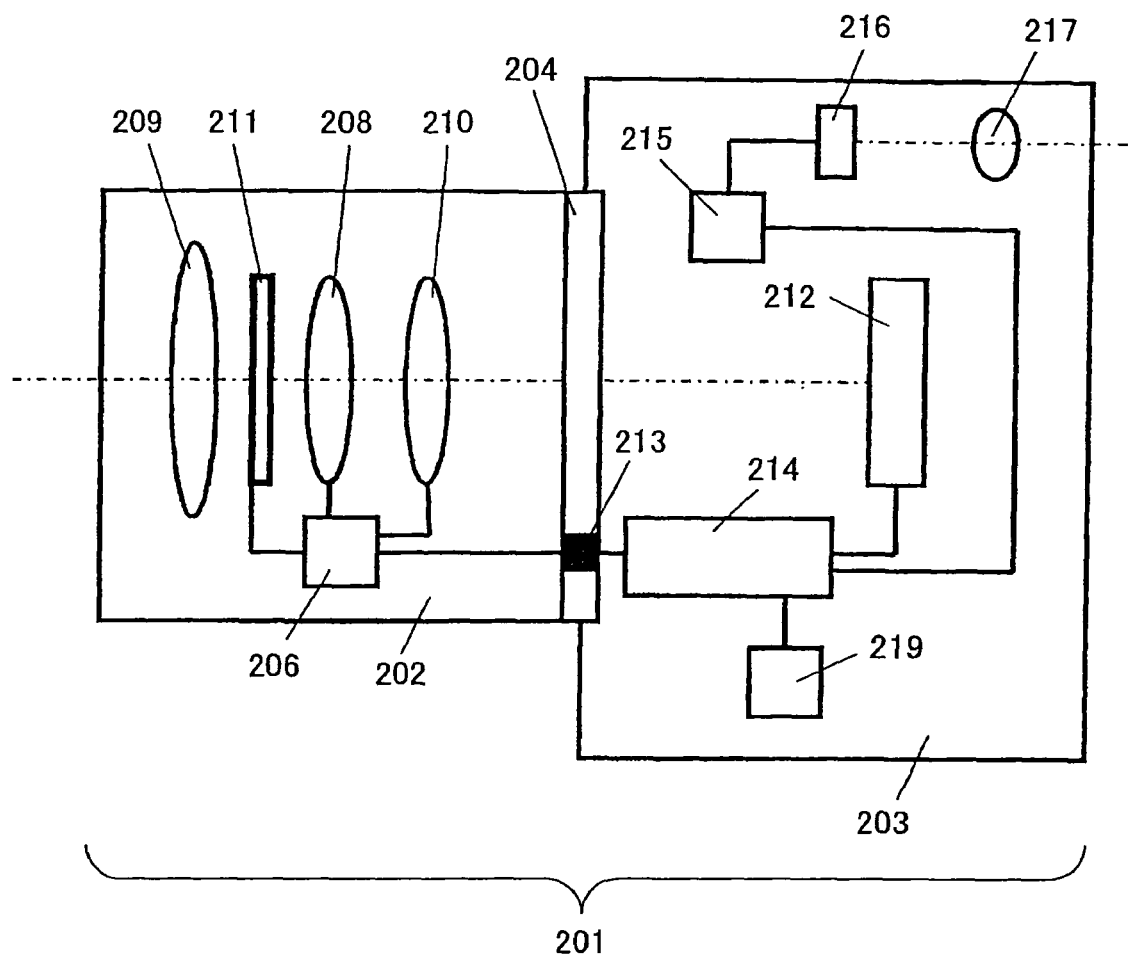
FIG. 1 is a horizontal cross-sectional view showing a structure of a camera according to an embodiment.

An imaging apparatus according to an embodiment is explained in connection with a digital still camera having an interchangeable lens as an example. FIG. 1 shows a horizontally cross-sectional view of the camera according to the embodiment. A digital camera 201 according to the embodiment is structured from an interchangeable lens 202 and a camera body 203. The interchangeable lens 202 is mounted on the camera body 203 via a mount part 204.

The interchangeable lens 202 is equipped with a lens 209, a zooming lens 208, a focusing lens 210, a diaphragm 211, a lens drive control device 206, and the like. The lens drive control device 206 is structured from an undepicted microcomputer, memory, drive control circuit and the like. The lens drive control device 206 controls the driving of the focusing lens 210 and the diaphragm 211, detects the status of the zooming lens 208, the focusing lens 210 and the diaphragm 211, and transmits lens information and receives camera information by communicating with a body drive control device 214 discussed below.

The camera body 203 is equipped with an imaging element 212, the body drive control device 214, a liquid crystal display element drive circuit 215, a liquid crystal display element 216, an eyepiece lens 217, a memory card 219, and the like. In the imaging element 212, imaging pixels are arranged two dimensionally, and focus detection elements are embedded at a part corresponding to the focus detection position(s).

The body drive control device 214 is structured from a microcomputer, a memory, a drive control circuit, and the like. The body drive control device 214 performs the drive control of the imaging element 212, the reading out of image signals and focus detection signals, the processing and recording of the image signals, the focus detection computation and the focus adjustment of the interchangeable lens 202 based on the focus detection signals, and the operational control of the camera. In addition, the body drive control device 214 communicates with the lens drive control device 206 via an electrical contact 213, to receive the lens information and to transmit the camera information (e.g., defocus amount and diaphragm stop amount).

The liquid crystal display element 216 functions as a liquid crystal view finder (EVF: electric view finder). The liquid crystal display element drive circuit 215 displays a through image by the imaging element 212 on the liquid crystal display element 216, so that a photographer can observe the through image via the eyepiece lens 217. The memory 219 is an image storage that stores images imaged by the imaging element 212.

An object image is formed on a light receiving surface of the imaging element 212 by a luminous flux that has transmitted though the interchangeable lens 202. The object image is photoelectrically converted by the imaging element 212, and the image signals and the focus detection signals are transmitted to the body drive control device 214.

The body drive control device 214 calculates a defocus amount based on the focus detection signals received from the focus detection pixels of the imaging element 212 and transmits the defocus amount to the lens drive control device 206. In addition, the body drive control device 214 inputs the image signals and the focus detection signals received from the imaging element 212, compensates the imaging pixel data at the position(s) of the focus detection pixels, that is, the pixel data output from the imaging pixels when proper imaging pixels are arranged at the position of the focus detection pixels, using the pixel data of the imaging pixels around the focus detection pixels, and stores the image signals determined from the pixel data of the imaging pixels and the compensated pixel data at the position(s) of the focus detection pixels. Further, the body drive control device 214 transmits the through image signals input from the imaging element 212 to the liquid crystal display element drive circuit 215, so that the through image is displayed on the liquid crystal display element 216. Furthermore, the body drive control device 214 controls the opening of the diaphragm 211 by transmitting the diaphragm control information to the lens drive control device 206.

The lens drive control device 206 changes the lens information depending on a focusing state, a zooming state, a diaphragm configuration state, a diaphragm aperture F-number, and the like. More specifically, the lens drive control device 206 detects the positions of the zooming lens 208 and the focusing lens 210, and the diaphragm stop for the diaphragm 211, and computes the lens information in response to the lens positions and the diaphragm stop amount, or selects the lens information in response to the lens positions and the diaphragm number from a lookup table provided in advance.

The lens drive control device 206 computes a lens drive amount based on the received defocus amount and drives the focusing lens 210 to a focal point in response to the lens drive amount. In addition, the lens drive control device 206 drives the diaphragm 211 in response to the received diaphragm stop amount.

On the camera body 203, the interchangeable lens 202, which has various image forming optical systems, is mountable via the mount part 204. The camera body 203 detects a focus adjustment state of the interchangeable lens 202 based on an output of the focus detection pixels embedded in the imaging element 212.

Figure 2:
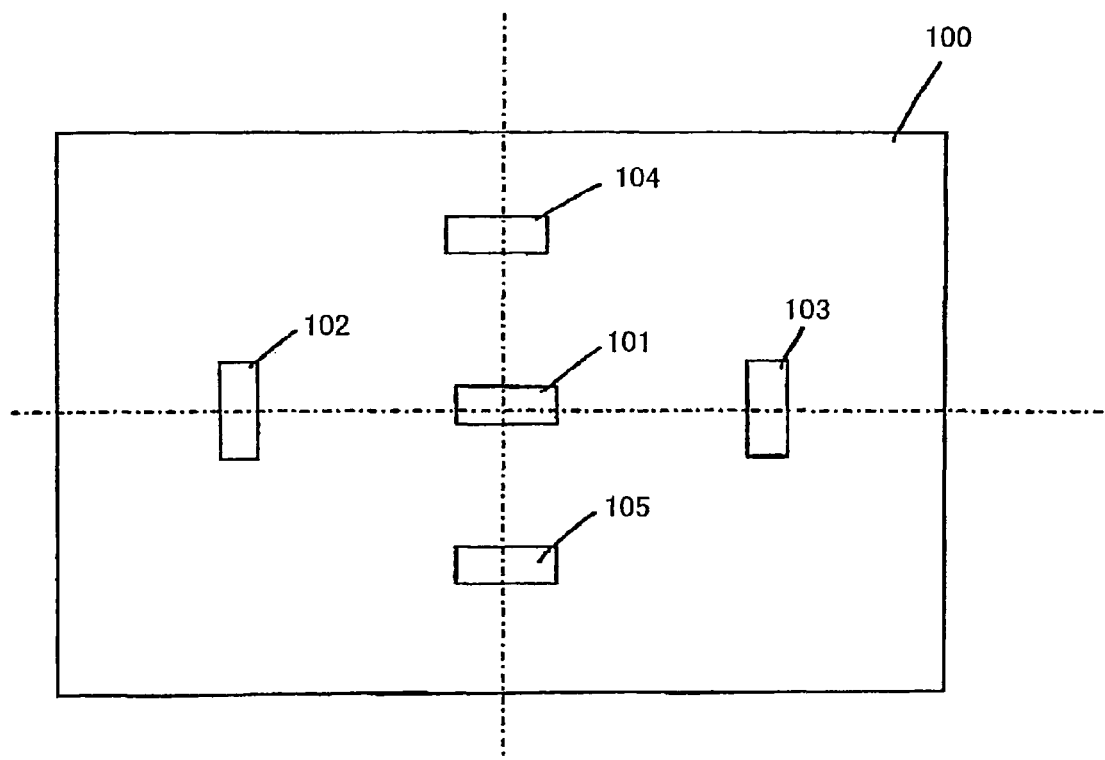
FIG. 2 is a figure showing focus detection positions on an imaging screen.

FIG. 2 shows the focus detection positions on the photographing screen, that is, focus detection areas that sample an image on a screen when detecting the focus by the below-discussed focus detection pixel array. There are five focus detection areas 101-105 located in the center and left, right, upper and lower sides of a rectangular photographing screen 100. The focus detection pixels are arranged linearly in the longitudinal direction of each of the focus detection areas 101-105 that are shown as rectangles.

Figure 3:
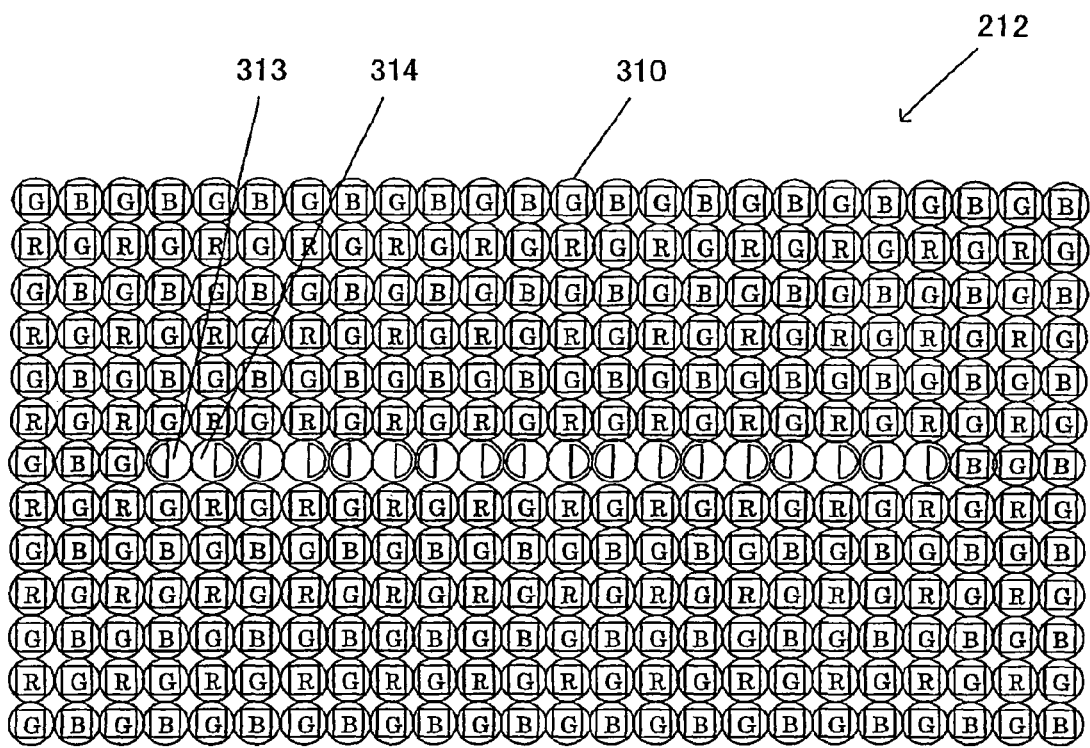
FIG. 3 is a front view showing a detailed structure of the imaging element.

FIG. 3 is a front view showing a detailed structure of the imaging element 212 and shows an enlarged view of the imaging element 212 near the focus detection area 101 (the same arrangement would be provided for the focus detection areas 104 and 105). The imaging element 212 is structured from imaging pixels 310 and focus detection pixels 313, 314. The imaging pixels 310 are arranged in a manner of a rectangular lattice two-dimensionally in the horizontal and vertical directions. The focus detection pixels 313, 314 are arranged in an array that extends in the horizontal direction.

Figure 5:
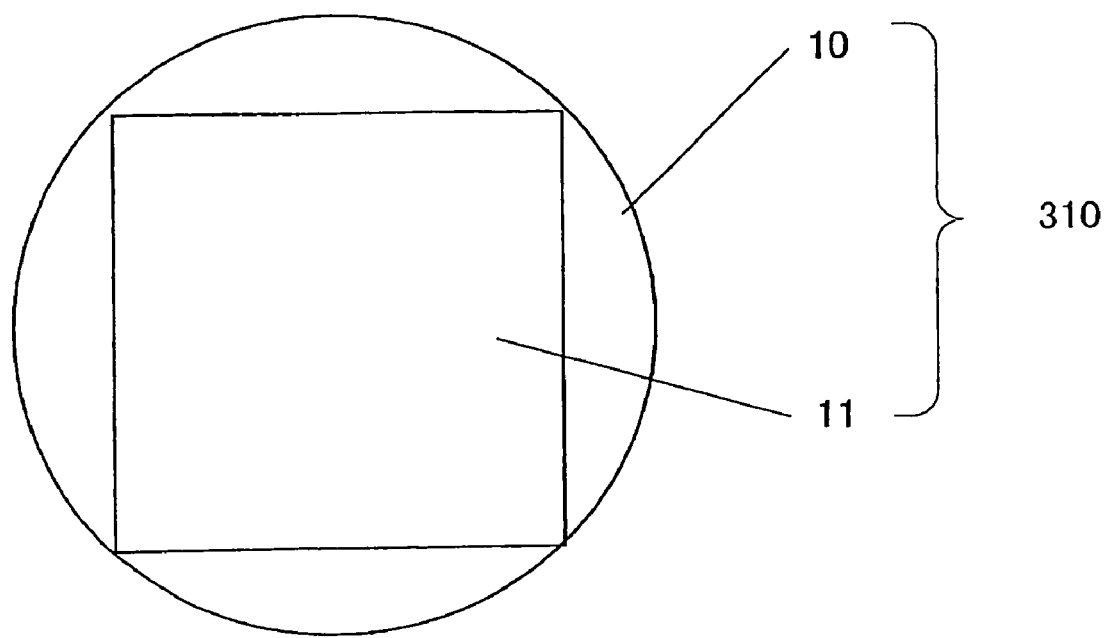
FIG. 5 is a figure showing a structure of the imaging element.
Figure 7:
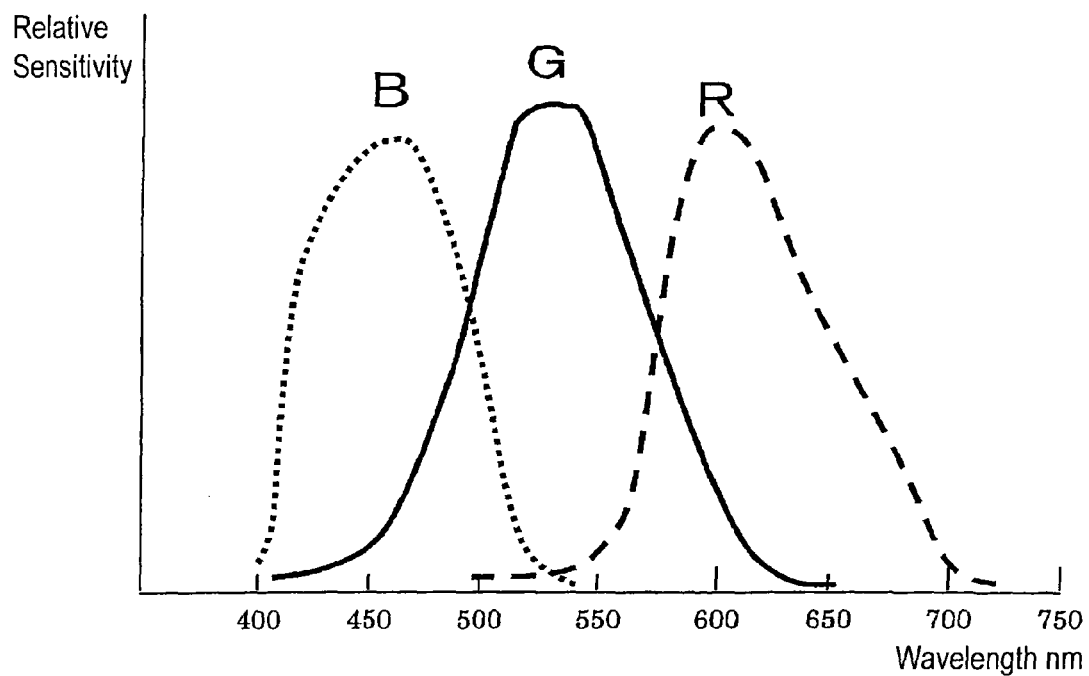
FIG. 7 is a figure showing spectral characteristics of the imaging pixel.

As shown in FIG. 5, the imaging pixels 310 are structured from a micro lens 10, a photoelectric converter 11 and color filters (not shown). The color filters are of three types: red (R), green (G) and blue (G). Spectral sensitivities of the color filters have characteristics shown in FIG. 7. Imaging pixels 310 respectively equipped with the different color filters are arranged in a manner a Bayer array.

Figure 6A:
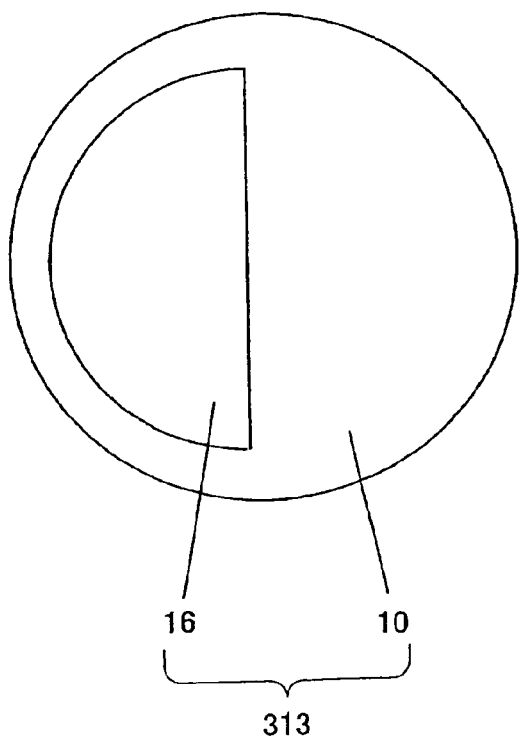
FIGS. 6(a) and 6(b) are figures showing a structure of a focus detection element.
Figure 6B:
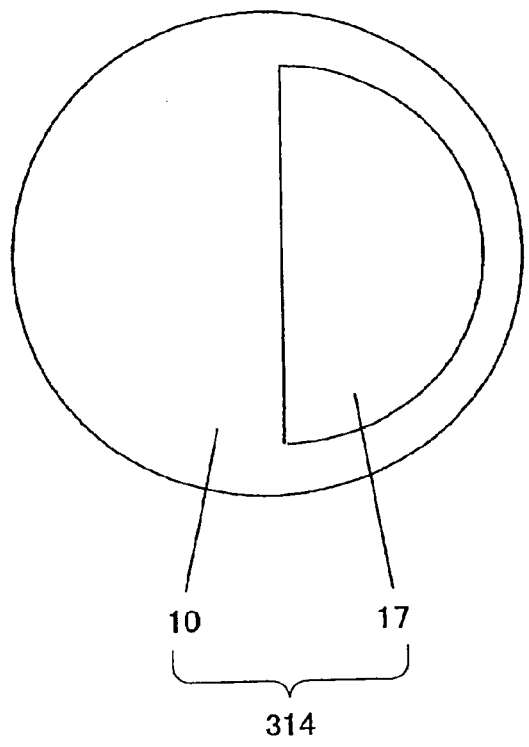

As shown in FIG. 6(*a*), the focus detection pixel 313 is structured from a micro lens 10 and a photoelectric converter 16. A shape of the photoelectric converter 16 is a left-semicircle that contacts a verticle bisector of the micro lens 10. In addition, as shown in FIG. 6(*b*), the focus detection pixel 314 is structured from the micro lens 10 and the photoelectric converter 17. The shape of the photoelectric converter 17 is a right-semicircle that contacts a vertical bisector of the micro lens 10. The photoelectric converters 16 and 17 are arranged in the horizontal direction if the respective micro lenses 10 are superimposed, and have symmetrical shapes about the vertical bisector of the micro lens 10. The focus detection pixels 313 and 314 are arranged alternately in the horizontal direction, that is, in the direction that the photoelectric converters 16 and 17 are arranged.

Figure 8:
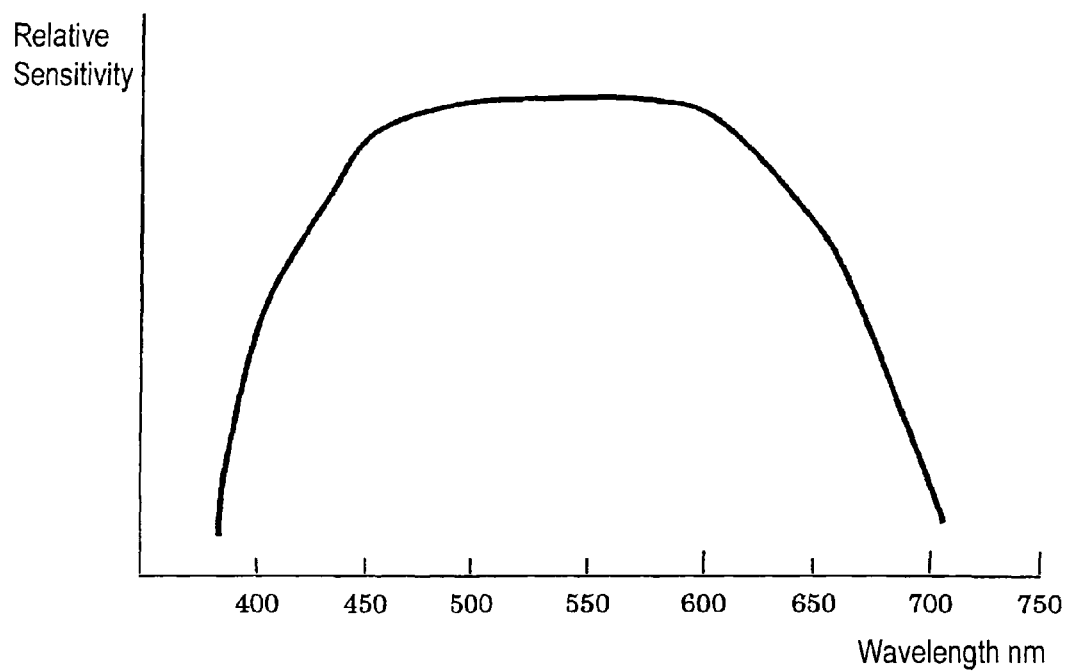
FIG. 8 is a figure showing spectral characteristics of the focus detection pixel.

To obtain an amount of light, color filters are not provided at the focus detection pixels 313, 314. The spectral characteristics of the focus detection pixels 313, 314 are a total of the spectral sensitivity of a photodiode that performs the photoelectric conversion and the spectral sensitivity of an infrared cut filter (not shown) (see FIG. 8). In other words, the spectral characteristics become similar to an addition of the spectral characteristics of the green, red and blue pixels, and an optical wavelength range for the spectral sensitivity of the focus detection pixels 313, 314 includes the optical wavelength ranges for the sensitivities of the green, red and blue pixels. The focus detection pixels 313, 314 are arranged in a row, in which the B and G filters of the imaging pixels 310 are to be arranged.

Figure 4:
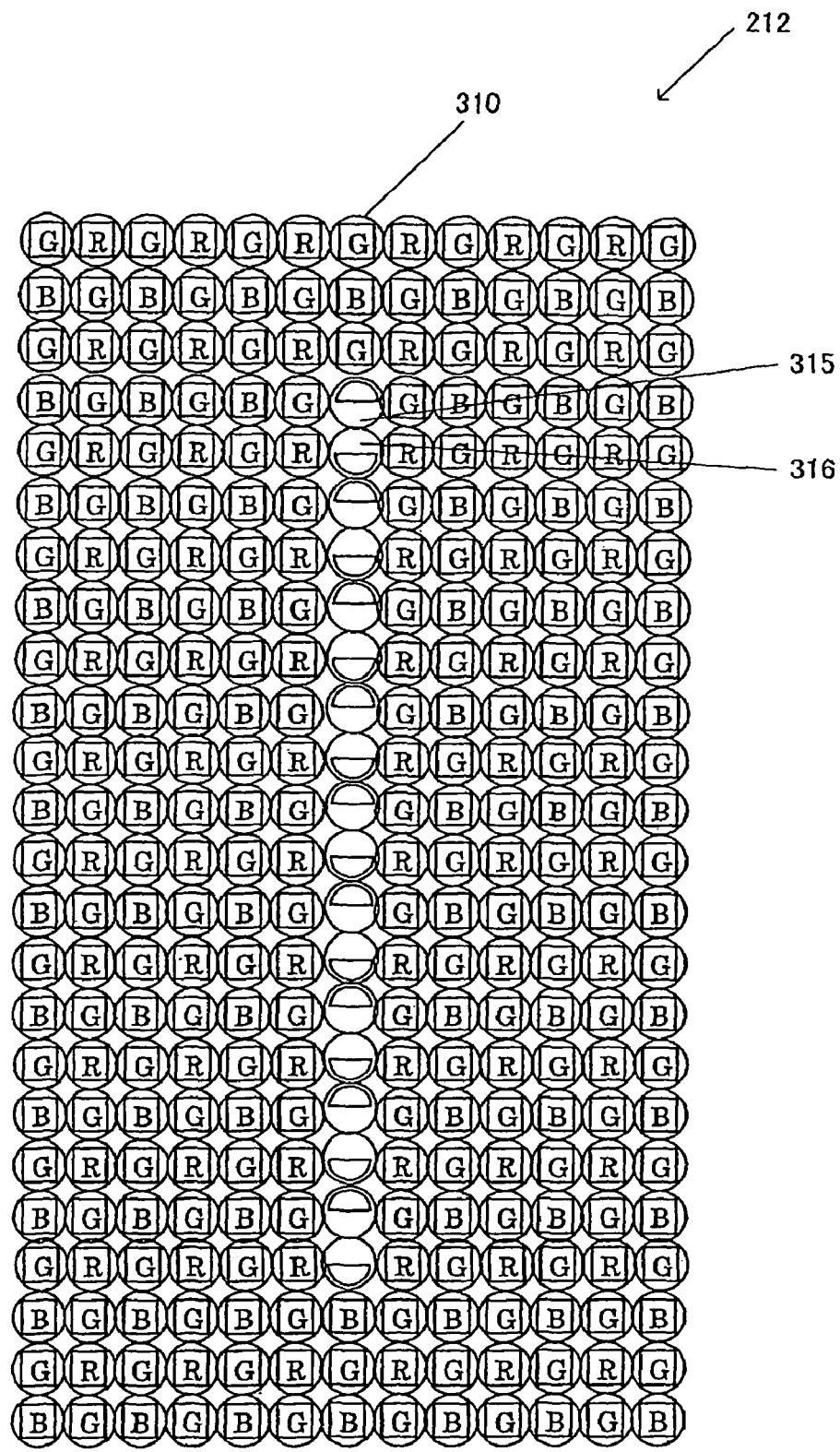
FIG. 4 is a front view showing a detailed structure of the imaging element.

FIG. 4 is a front view showing a detailed structure of the imaging element 212 and shows an enlarged view of the imaging element 212 near the focus detection area 102 (the same arrangements would be provided for the focus detection area 103). The imaging element 212 is structured from imaging pixels 310 and focus detection pixels 315, 316. The focus detection pixels 315, 316 have a structure in which the focus detection pixels 313, 314 are rotated by 90 degrees and are arranged in a perpendicular direction (a direction perpendicular to the direction of the focus detection pixels 313, 314) on the imaging surface. In the embodiment, the perpendicular direction is the vertical direction. The focus detection pixels 315, 316 are arranged in a column, in which B and G filters of the imaging pixels 310 are to be arranged.

The reason why the focus detection pixels 313, 314, 315 and 316 are arranged in the row and the column in which the B and G filters of the imaging pixels 310 are to be arranged is because a compensation error is unnoticeable with the blue pixels compared to the red pixels based on the visual acuity of humans, when the compensation error is generated in the below-discussed pixel compensation process.

Figure 9:
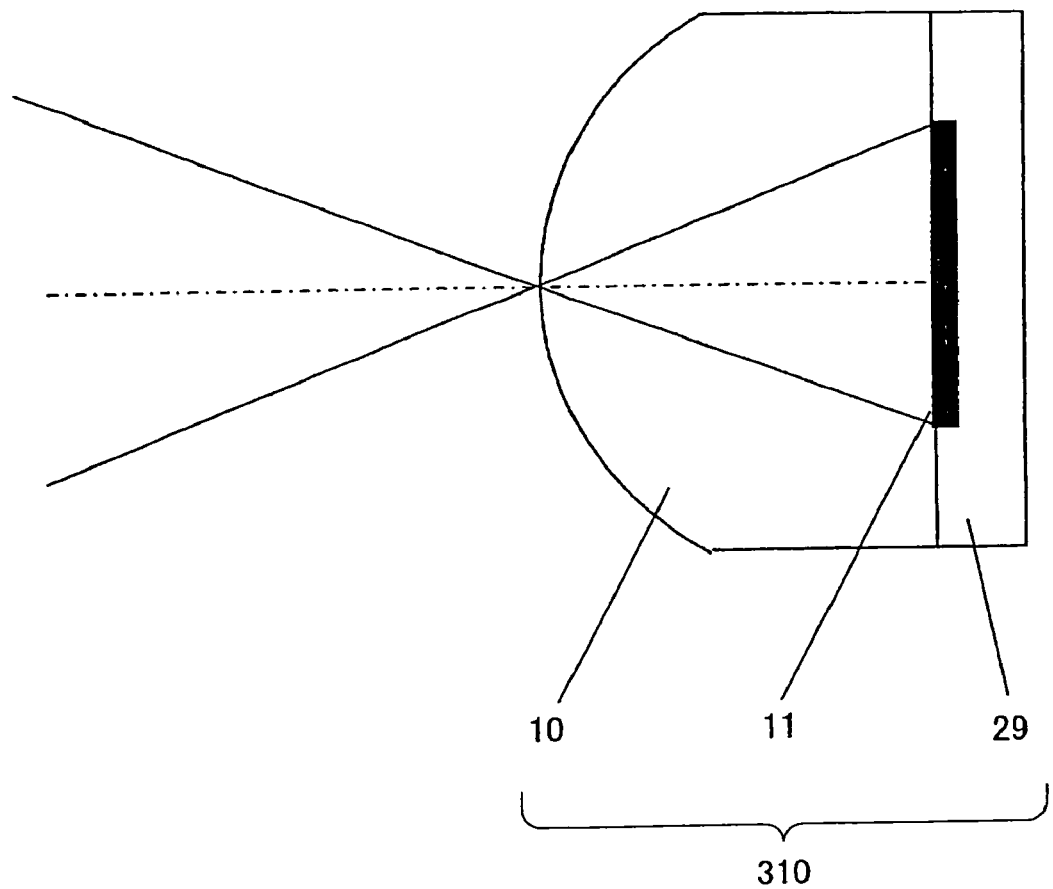
FIG. 9 is a cross-sectional view of the imaging pixel.

FIG. 9 is a cross-sectional view of the imaging pixel 310. In the imaging pixel 310, the micro lens 10 is positioned in front of the photoelectric converter 11 for imaging so that the photoelectric converter 11 faces to the front side of the micro lens 10. The photoelectric converter 11 is formed on a semiconductor circuit board 29. The undepicted color filter is placed between the micro lens 10 and the photoelectric converter 11.

Figure 10A:
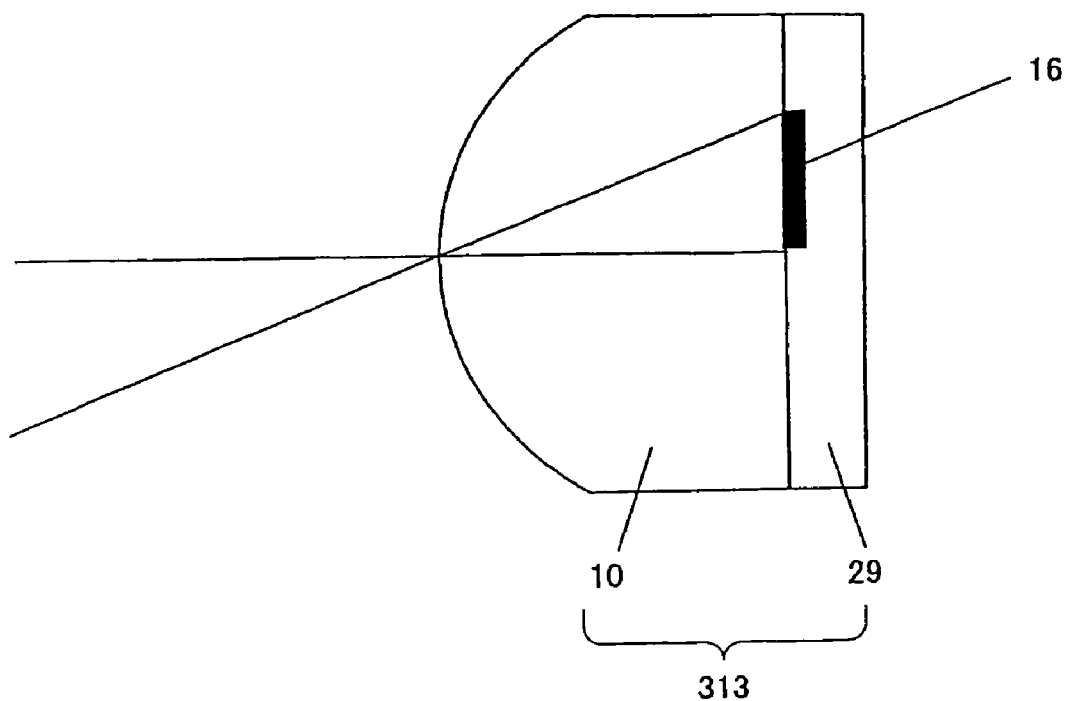
FIGS. 10(a) and 10(b) are cross-sectional views of the focus detection pixel.

FIG. 10(*a*) is a cross-sectional view of the focus detection pixel 313. In the focus detection pixel 313, the micro lens 10 is placed in front of the photoelectric converter 16, so that the photoelectric converter 16 faces to the front side of the micro lens 10. The photoelectric converter 16 is formed on the semiconductor circuit board 29, and the micro lens 10 is integrally and fixedly formed on the circuit board 29 by a manufacturing process of a semiconductor image sensor. The photoelectric converter 16 is positioned on one side of an optical axis of the micro lens 10.

Figure 10B:
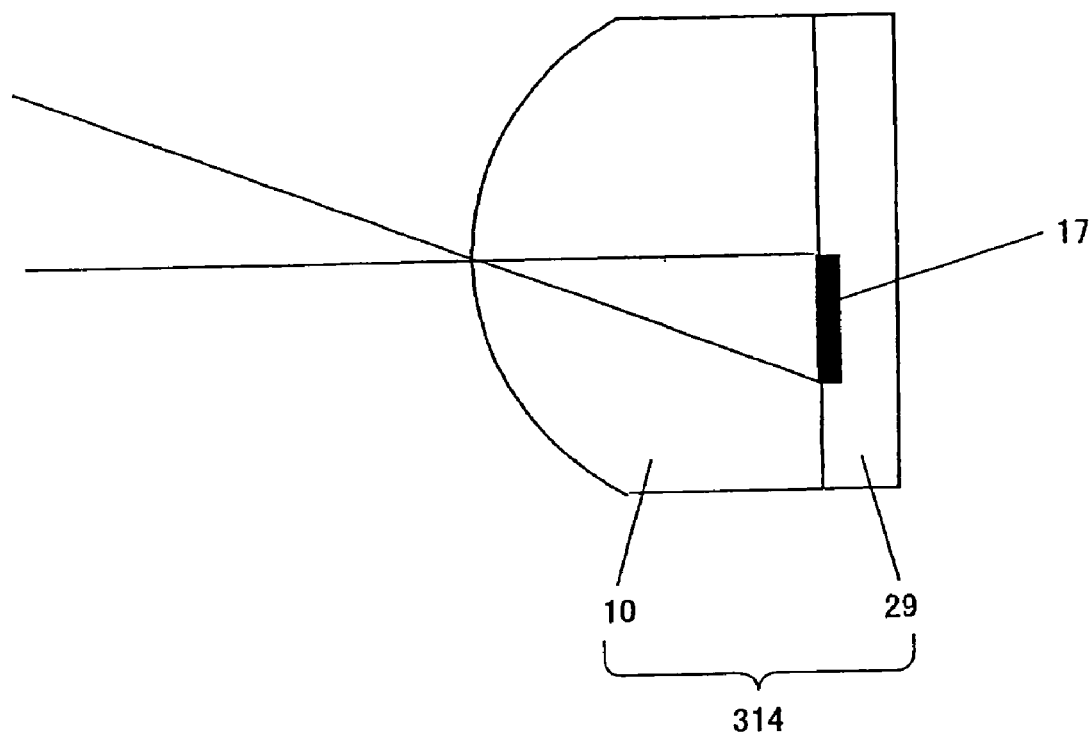

FIG. 10(b) is a cross-sectional view of the focus detection pixel 314. In the focus detection pixel 314, the micro lens 10 is placed in front of the photoelectric converter 17, so that the photoelectric converter 17 faces to the front side of the micro lens 10. The photoelectric converter 17 is formed on the semiconductor circuit board 29, and the micro lens 10 is integrally and fixedly formed on the circuit board 29 by the manufacturing process of a semiconductor image sensor. The photoelectric converter 17 is positioned on one side of an optical axis of the micro lens 10 that is opposite to the side on which the photoelectric converter 16 is positioned.

Figure 11:
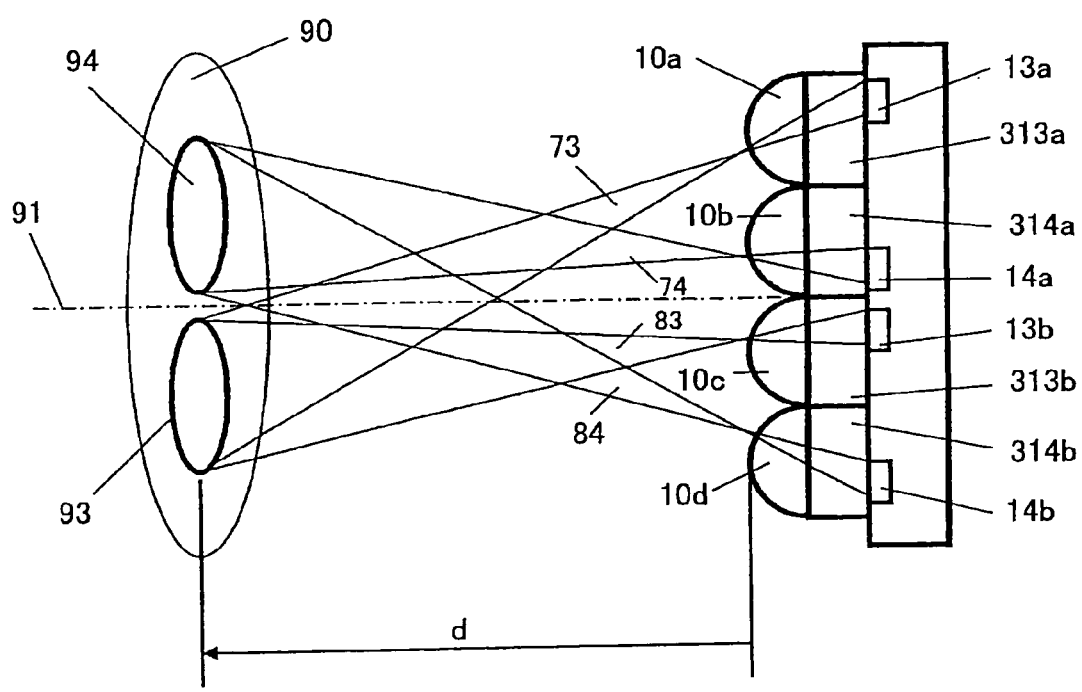
FIG. 11 is a figure showing a structure of a focus detection optical system using a pupil-division type phase difference detection method that includes a micro lens.

FIG. 11 shows a structure of the focus detection optical system by a pupil-division type phase difference detection method using a micro lens. In the figure, reference numeral 90 is an exit pupil set at a distance d in front of the micro lens that is positioned on a predetermined image forming plane of the interchangeable lens. The distance d is a distance determined by a curvature and a refractive index of the micro lens and a distance between the micro lens and the photoelectric converter, and is referred to as a ranging pupil distance in the present specification. Reference numeral 91 is an optical axis of the interchangeable lens. Reference numerals 10a-10d are micro lenses. Reference numeral 13a, 13b, 14a and 14b are photoelectric converters. Reference numerals 313a, 313b, 314a and 314b are pixels. Reference numerals 73, 74, 83 and 84 are luminous fluxes (light rays).

In particular, reference numeral 93 is an area to which the photoelectric converters 13a and 13b are projected by the micro lenses 10a and 10c, respectively, and is referred to as a ranging pupil. Similarly, reference numeral 94 is an area to which the photoelectric converters 14a and 14b are projected by the micro lenses 10b and 10d, respectively, and also is referred to as a ranging pupil. In FIG. 11, to make the explanation easy to understand, the ranging pupils are shown as oval areas. However, in reality, they have a shape that is an enlargement of the shape of the respective photoelectric converters.

FIG. 11 shows a schematic example of four pixels (pixels 313a, 313b, 314a and 314b). However, for the other pixels, the photoelectric converters receive the luminous fluxes transmitted to each micro lens from the corresponding ranging pupils. The direction of the focus detection pixel array is matched to the direction of the arrangement of a pair of the ranging pupils, that is, the direction of arrangement of a pair of the photoelectric converters.

The micro lenses 10a-10d are positioned near the predetermined image forming plane of the interchangeable lens. By the micro lenses 10a-10d, shapes of the photoelectric converters 13a, 13b, 14a and 14b, which are positioned behind the micro lenses 10a-10d, respectively, are projected on the exit pupil 90 separated from the micro lenses 10a-10d by the ranging pupil distance d. The shape of the projection forms the ranging pupils 93, 94. In other words, the projection direction of the photoelectric converter for each of the pixels is determined so that the projected shape (ranging pupils 93, 94) of the photoelectric converters for each of the pixels match on the exit pupil 90 at the projection distance d.

The photoelectric converter 13a outputs a signal corresponding to an intensity of an image formed on the micro lens 10a by the luminous flux 73 that has passed though the ranging pupil 93 and is directed to the micro lens 10a. The photoelectric converter 13b outputs a signal corresponding to an intensity of an image formed on the micro lens 10c by the luminous flux 83 that has passed though the ranging pupil 93 and is directed to the micro lens 10c. The photoelectric converter 14a outputs a signal corresponding to an intensity of an image formed on the micro lens 10b by the luminous flux 74 that has passed though the ranging pupil 94 and is directed to the micro lens 10b. The photoelectric converter 14b outputs a signal corresponding to an intensity of an image formed on the micro lens 10d by the luminous flux 84 that has passed though the ranging pupil 94 and is directed to the micro lens 10d.

By placing a large number of the above-discussed two types of focus detection pixels and by collecting the outputs of the photoelectric converter for each pixel into an output group corresponding to the ranging pupils 93 and 94, respectively, information relating to an intensity distribution of a pair of the images that the luminous fluxes for focus detection that pass though the ranging pupils 93 and 94, respectively, form on the pixel arrays, can be obtained. By performing the below-discussed image shift detection calculating process, an image shift amount for the pair of images is detected using a so-called pupil-division type phase difference detection method. Further, by performing a conversion computation on the image shift amount in response to a space between the centers of gravity for the pair of the ranging pupils, a deviation (defocus amount) of the current image forming plane with respect to the predetermined image plane, that is, the image forming plane at the focus detection position corresponding to the position of the micro lens array on the predetermined image forming plane, is calculated.

Figure 12:
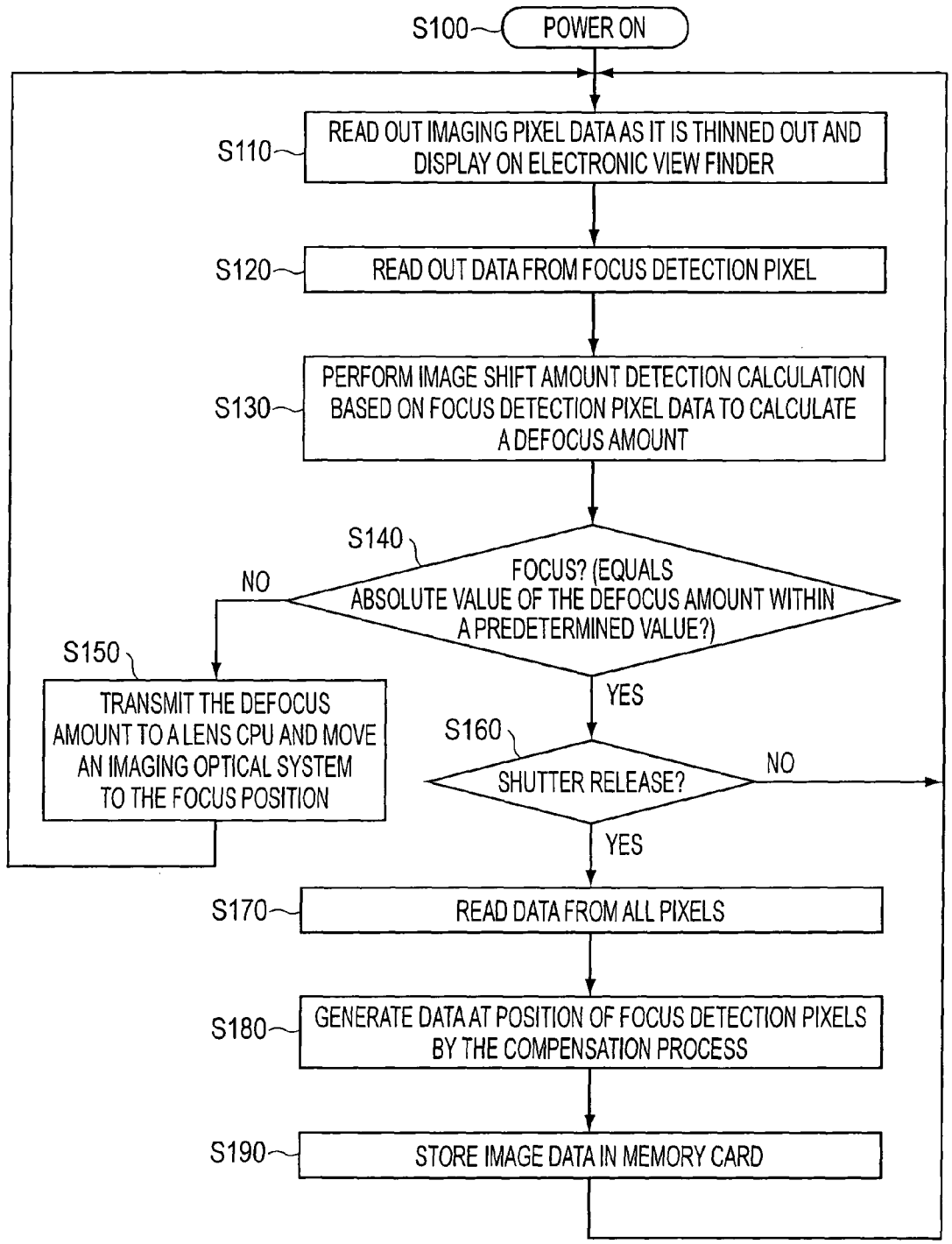
FIG. 12 is a flow chart showing an operation of a digital camera (imaging device) of one embodiment.

FIG. 12 is a flowchart showing an operation of the digital still camera (imaging device) of an embodiment. The operation of the body drive control device 214 starts from step 110 when the power of the camera is turned on at step 100. In step 110, data of the imaging pixels is read, as it is thinned out, from the imaging element 212 and is displayed on the electric view finder. In next step 120, a pair of image data corresponding to the pair of images is read from the focus detection pixel array. The focus detection area is selected by the operator's control of a focus detection area selection switch (not shown).

In step 130, the image shift detection calculating process (correlation calculating process) is performed based on the read-out pair of image data of the imaging pixels, and a calculated image shift amount is converted to a defocus amount. In step 140, a determination is made as to whether it is near focus by determining whether an absolute value of the calculated defocus amount is within a predetermined value. If it is determined to be not near focus, the process moves to step 150 to transmit the defocus amount to the lens drive control device 206 and to drive the focusing lens 210 of the interchangeable lens 202 shown in FIG. 1 to the focus position. Thereafter, the process returns to step 110 and repeats the above-described operations.

If the focus is not detected at step 140, the process moves to step 150 to transmit a scan drive instruction to the lens drive control device 206, and based on the scan drive instruction, the focusing lens 210 of the interchangeable lens 202 is scan-driven from the infinite position to the closest position. The process then returns to step 110 and repeats the above-described operations.

On the other hand, if it is determined at step 140 that it is near focus, the process advances to step 160 and determines whether a shutter has been released by an operation of a shutter release button (not shown). If it is determined that the shutter has not been released, the process returns to step 110 and repeats the above-described operations. If it is determined that the shutter has been released, a diaphragm adjustment instruction is transmitted to the lens drive control device 206 and sets a diaphragm stop of the interchangeable lens 202 to a control F-number (an F-number set automatically or by the user). When the diaphragm control is completed, the imaging element 212 performs the imaging operation, and image data is read from the imaging pixels and all focus detection pixels of the imaging element 212.

In step 180, the pixel data at each pixel position of the focus detection pixel array is compensated based on the data of the imaging pixels in the proximity of the focus detection pixels. The details of this pixel compensation are described below. In next step 190, the image data composed of the data of the imaging pixels and the compensated data is stored in a memory card 219. The process then returns to step 110 and repeats the above-described operations.

Next, details of the image shift detection calculating process (correlation calculating process) at step 130 shown in FIG. 12 are explained. Because the pair of images that the focus detection pixels detect may have an uneven balance of light amount due to the ranging pupils being shaded by the diaphragm aperture of the lens, a type of correlation calculation, in which the accuracy in detecting the image shift with respect to the balance of the light amount is maintained, is performed. The correlation calculation by below Equation (1) is performed for a pair of data arrays A11-A1M, A21-A2M (M being a number of data) read from the focus detection pixels arrays, to calculate the correlation amount C(k).

$$C(k)=\Sigma |A1n \cdot A2n+1+k - A2n+k \cdot A1n+1| \qquad (1)$$

Figure 13A:
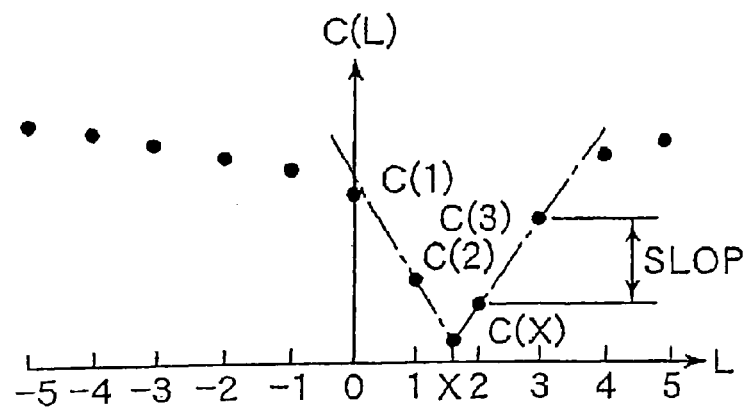
FIGS. 13(a)-13(c) are figures for explaining a method for judging reliability of the focus detection result.
Figure 13B:
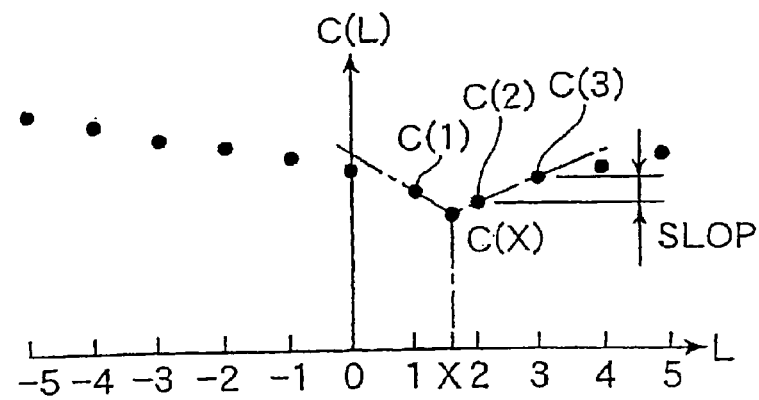
Figure 13C:
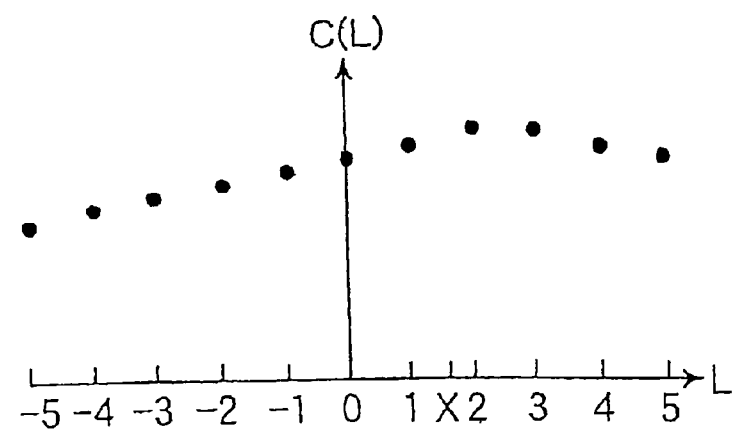

In Equation (1), the calculation of Σ is accumulated by the value of n. The range of the value n is limited to a range in which the data for A1n, A1n+1, A2n+k and A2n+1+k exists depending on an image shift amount k. The image shift amount k is an integer and a relative shift amount by data intervals of the data arrays. As shown in FIG. 13(*a*), as the result of calculation by Equation (1), the correlation amount C(k) becomes minimal (the smaller the correlation amount is, the higher the degree of correlation is) at a shift amount in which the correction of the pair of data is high (in FIG. 13(*a*), k=kj=2). The equation for calculating the correlation is not limited to Equation (1).

Next, using a three-point interpolation method as described by Equations (2)-(5), a shift amount x that provides the minimum value C(x) for a continuous correlation amount is determined.

$$x = kj + D/SLOP \qquad (2),$$

$$C(x) = C(kj) - |D| \qquad (3),$$

$$D = \{C(kj-1) - C(kj+1)\}/2 \qquad (4),$$

$$SLOP = MAX\{C(kj+1) - C(kj), C(kj-1) - C(kj)\} \qquad (5)$$

A determination as to whether the shift amount x should be calculated by Equation (2) is discussed below. As shown in FIG. 13(*b*), when the degree of correlation for the pair of data is low, the minimum value C(x) for the interpolated correction amount increases. Therefore, when C(x) is equal to or greater than a predetermined threshold value, it is judged that the reliability of the calculated shift amount is low, and thus the calculated shift amount x is canceled. Alternatively, to standardize the value C(x) by a contrast of the data, if a value, from which the value C(x) is removed by the value SLOP, which is a value proportional to the contrast, is equal to or less than a predetermined value, it is judged that the reliability of the calculated shift amount is low, and the calculated shift amount x is canceled. Yet alternatively, if the value SLOP, which is a value proportional to the contrast, is equal to or less than a predetermined value, the object is at a low contrast. Therefore, it is judged that the reliability of the calculated shift amount is low, and the calculated shift amount x is canceled.

As shown in FIG. 13(*b*), if the degree of correlation for the pair of data is low, and if the correlation amount C(k) does not drop between a shift range kmin-kmax, the minimum value C(x) cannot be determined. In such a case, it is judged that focus detection is impossible.

If the calculated shift amount x is judged to be reliable, the calculated shift amount x is converted into an image shift amount shft using Equation (6).

$$shft = PY \cdot x \qquad (6)$$

In Equation (6), the value PY is a detection pitch, that is, a pitch of the focus detection pixels. Next, the image shift amount shft is converted into a defocus amount def by multiplying a predetermined conversion factor k to the image shift amount calculated by Equation (6).

$$def = k \cdot shft \qquad (7)$$

Figure 14A:
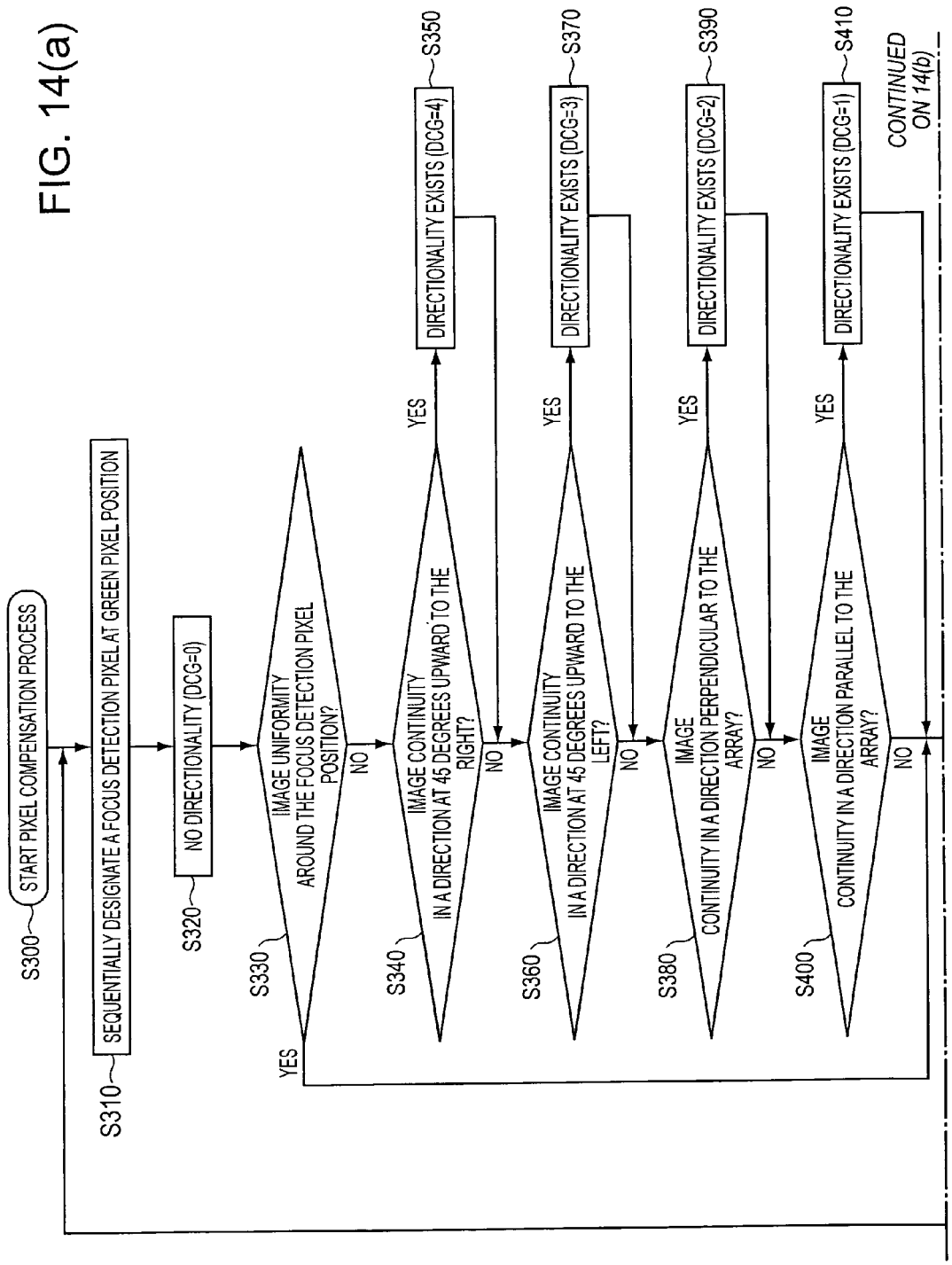
FIG. 14 is a flow chart showing a detailed operation of a pixel compensation process.
Figure 14B:
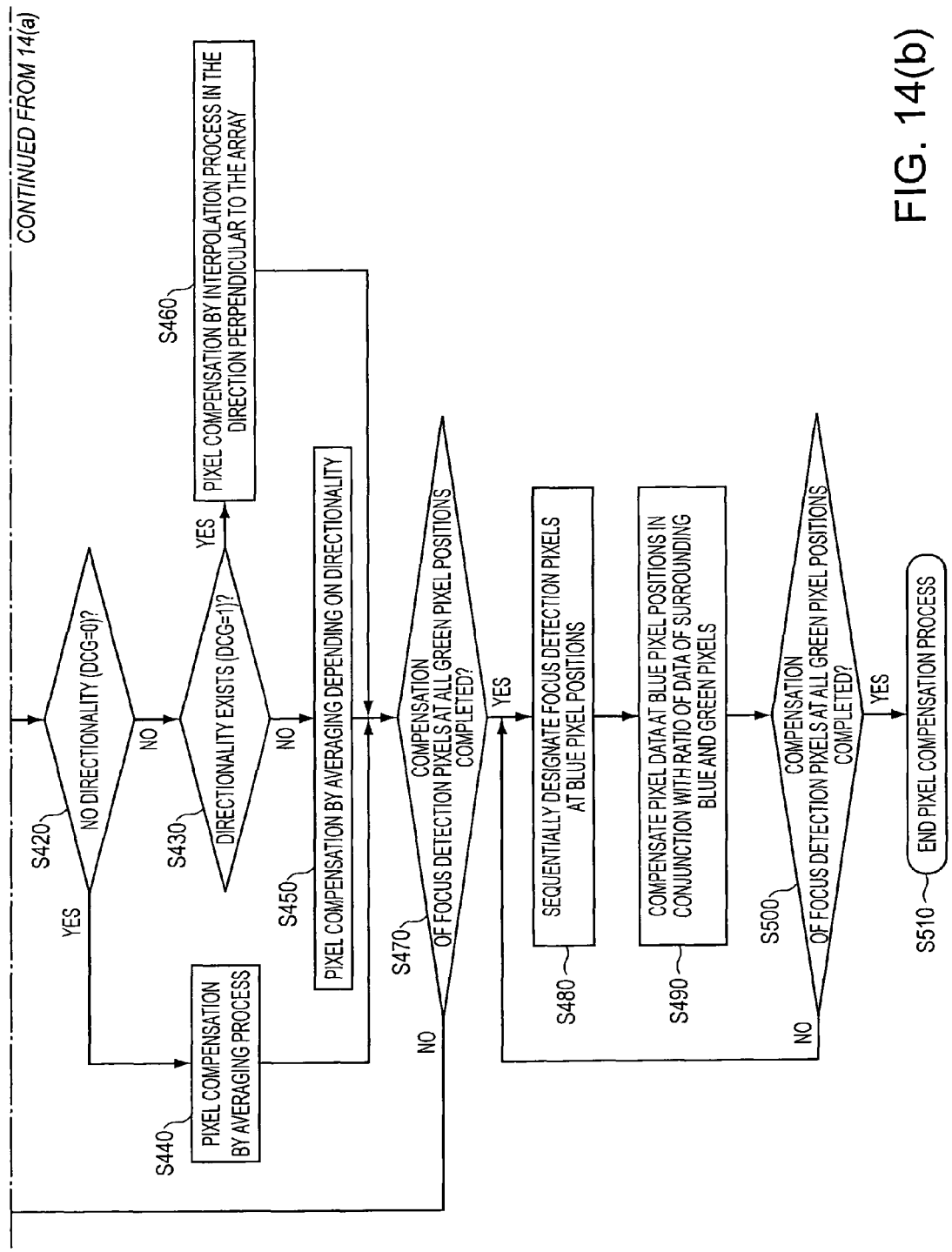

FIG. 14 is a flowchart showing a detailed operation of the image compensation process at step 180 in FIG. 12. The body drive control device 214 starts the image compensation process from step 300. FIG. 15 shows, by Gij, Bij, and Rij, the data of each pixel when focus detection pixels are arranged in one row inside the two-dimensionally Bayer-arranged image pixels (row indicated by shading in the figure). In the pixel compensation process, the pixel data (G03, B13, G23, B33, G43 and B53) in the shaded areas is compensated by data of the surrounding image pixels.

In step 310, among the focus detection pixels positioned in a row or column of G and B, each of the focus detection pixels positioned at a location at which a green pixel is supposed to be placed is sequentially designated. Here, the explanation is made with an example that the focus detection pixel at a position where the pixel data G23 is to be outputted is designated. In step 320, a parameter DCG indicating a direction with high image continuity is initialized, assuming that there is no direction with high image continuity at the position of this focus detection pixel. Here, the direction with high image continuity is a direction in which an edge pattern or a line pattern extends if the image is an edge pattern or a line pattern, for example.

In step 330, it is determined whether there is a uniformity of the image near the position of the focus detection pixel. The uniformity of the image may be determined by the following exemplary method. Using the image data of green pixels around the focus detection pixel located at a position at which the green pixel G23 is supposed to be located, an average value Gav of the green pixels around the focus detection pixel, and a value Gsd indicating a deviation of the pixel data near the position of the focus detection pixel, are calculated.

$$Gav = (G10 + G30 + G21 + G12 + G32 + G14 + G34 + G25 + G16 + G36)/10 \qquad (8),$$

$$Gsd = (|G10 - Gav| + |G30 - Gav| + |G21 - Gav| + |G12 - Gav| + |G32 - Gav| + |G14 - Gav| + |G34 - Gav| + |G25 - Gav| + |G16 - Gav| + |G36 - Gav|)/(10 \cdot Gav) \qquad (9)$$

If the value Gsd indicating the deviation of the pixel data near the position of the focus detection pixel is within a predetermined threshold, it is judged to have image uniformity. If the judgment of image uniformity is made, the process proceeds to step 420. If it is judged that there is no image uniformity, the process moves to step 340.

In step 340, it is judged whether there is image continuity in a direction at 45 degrees upward to the right (direction indicated by DCG=4 in FIG. 16), with respect to the direction of the arrangement of the focus detection pixels (right-to-left direction in the example shown in FIG. 15). The image continuity in the direction at 45 degrees upward to the right is judged by, for example, the following equations.

$$Gav1=(G12+G21)/2 \quad (10),$$

$$Gsd1=|G12-G21|/Gav1 \quad (11),$$

$$Gav2=(G14+G32)/2 \quad (12),$$

$$Gsd2=|G14-G32|/Gav2 \quad (13),$$

$$Gav3=(G25+G34)/2 \quad (14),$$

$$Gsd3=|G25-G34|/Gav3 \quad (15),$$

$$Gdf12=|Gav1-Gav2| \quad (16),$$

$$Gdf13=|Gav1-Gav3| \quad (17), and$$

$$Gdf23=|Gav2-Gav3| \quad (18)$$

If all values Gsd1, Gsd2 and Gsd3 that indicate the deviations of the pixel data in the direction at 45 degrees upward to the right are within a predetermined threshold value, and if any of the deviations Gdf12, Gdf13 and Gdf23 for the pixel data in the direction perpendicular to the direction at 45 degrees upward to the right exceed a predetermined threshold value, it is judged that there is image continuity in the direction at 45 degrees upward to the right. If it is judged that there is image continuity in the direction at 45 degrees upward to the right (direction indicted by DCG=4 in FIG. 16), the process moves to step 350. Then, after setting parameter DCG indicating a direction with high image continuity to 4, the process advances to step 360. On the other hand, if it is not judged to have the continuity, the process moves to step 360 from step 340.

In step 360, it is judged whether there is an image continuity in a direction at 45 degrees upward to the left (direction indicated by DCG=3 in FIG. 16) with respect to the direction of the arrangement of the focus detection pixels. The image continuity in the direction at 45 degrees upward to the left is judged by the following exemplary method.

$$Gav1=(G14+G25)/2 \quad (19),$$

$$Gsd1=|G14-G25|/Gav1 \quad (20),$$

$$Gav2=(G12+G34)/2 \quad (21),$$

$$Gsd2=|G12-G34|/Gav2 \quad (22),$$

$$Gav3=(G21+G32)/2 \quad (23),$$

$$Gsd3=|G21-G32|/Gav3 \quad (24),$$

$$Gdf12=|Gav1-Gav2| \quad (25),$$

$$Gdf13=|Gav1-Gav3| \quad (26), and$$

$$Gdf23=|Gav2-Gav3| \quad (27)$$

If all values Gsd1, Gsd2 and Gsd3 that indicate the deviations of the pixel data in the direction at 45 degrees upward to the left are within a predetermined threshold value, and if any of deviations Gdf12, Gdf13 and Gdf23 for the pixel data in the direction perpendicular to the direction at 45 degrees upward to the left exceed a predetermined threshold value, it is judged that there is image continuity in the direction at 45 degrees upward to the left. If it is judged that there is image continuity in the direction at 45 degrees upward to the left, the process moves to step 370. Then, after setting parameter DCG indicating a direction with a high image continuity to 3, the process advances to step 380. On the other hand, if it is not judged to have the continuity, the process moves to step 380 from step 360.

Figure 16:
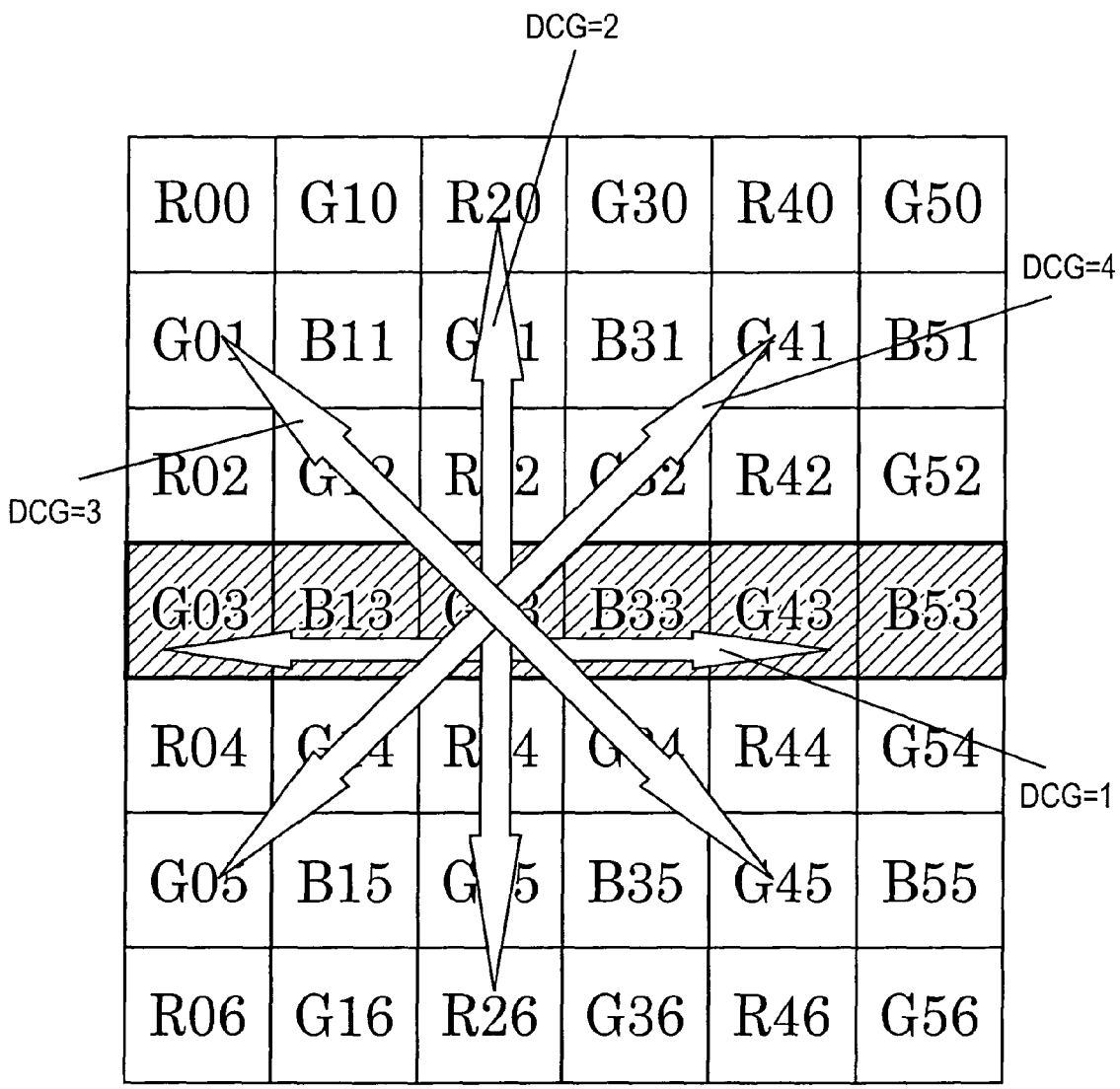
FIG. 16 is a figure showing directions of image continuity.

In step 380, it is judged whether there is an image continuity in a direction perpendicular to the direction of arrangement of the focus detection pixels (direction indicated by DCG=2 in FIG. 16). The image continuity in the direction perpendicular to the direction of the focus detection pixel array is judged by the following exemplary method.

$$Gav1=(G12+G14)/2 \quad (28),$$

$$Gsd1=|G12-G14|/Gav1 \quad (29),$$

$$Gav2=(G21+G25)/2 \quad (30),$$

$$Gsd2=|G21-G25|/Gav2 \quad (31),$$

$$Gav3=(G32+G34)/2 \quad (32)$$

$$Gsd3=|G32-G34|/Gav3 \quad (33),$$

$$Gdf12=|Gav1-Gav2| \quad (34),$$

$$Gdf13=|Gav1-Gav3| \quad (35), and$$

$$Gdf23=|Gav2-Gav3| \quad (36)$$

If all values Gsd1, Gsd2 and Gsd3 that indicate the deviations of the pixel data in the direction perpendicular to the direction of the focus detection pixel array are within a predetermined threshold value, and if any of the deviations Gdf12, Gdf13 and Gdf23 for the pixel data in the direction of the focus detection pixel array exceeds a predetermined threshold value, it is judged that there is image continuity in the direction perpendicular to the direction of arrangement of the focus detection pixels. If it is judged that there is image continuity in the direction perpendicular to the direction of the focus detection pixel array, the process moves to step 390. Then, after setting the parameter DCG indicating a direction with the high image continuity to 2, the process advances to step 400. On the other hand, if it is not judged to have the continuity, the process moves to step 400 from step 380.

In step 400, it is judged whether there is an image continuity in the direction of the focus detection pixel array (direction indicated by DCG=1 in FIG. 16). The image continuity in the direction of the focus detection pixel array is judged by the following exemplary method.

$$Gav1=(G01+G21+G41)/3 \quad (37),$$

$$Gsd1=(|G01-Gav1|+|G21-Gav1|+|G41-Gav1|)/(3\cdot Gav1) \quad (38),$$

$$Gav2=(G12+G32)/2 \quad (39),$$

$$Gsd2=|G12-G32|/Gav2 \quad (40),$$

$$Gav3=(G14+G34)/2 \quad (41),$$

$$Gsd3=|G14-G34|/Gav3 \quad (42),$$

$$Gav4=(G05+G25+G45)/2 \quad (43),$$

$$Gsd4=(|G05-Gav4|+|G25-Gav4|+|G45-Gav4|)/Gav4 \quad (44),$$

$$Gdf12=|Gav1-Gav2| \quad (45),$$

$$Gdf23=|Gav2-Gav3| \quad (46), \text{ and}$$

$$Gdf34=|Gav3-Gav4| \quad (47)$$

If all values Gsd1, Gsd2 and Gsd3 that indicate the deviations of the pixel data in the direction of the focus detection pixel array are within a predetermined threshold value, and if any of the deviations Gdf12, Gdf13 and Gdf23 for the pixel data in the direction perpendicular to the direction of the focus detection pixel array exceeds a predetermined threshold value, it is judged that there is image continuity in the direction of the focus detection pixel array. If it is judged that there is image continuity in the direction of the focus detection pixel array, the process moves to step 410. Then, after setting the parameter DCG indicating a direction with a high image continuity to 1, the process advances to step 420. On the other hand, if it is not judged to have the continuity, the process moves to step 420 from step 400.

In step 420, whether there is a directionality of the image near the position of the focus detection pixel is checked using the parameter DCG. If there is no directionality of the image near the position of the focus detection pixel (DCG=0), that is, if the image is uniform or random near the position of the focus detection pixel, the process moves to step 440; otherwise, the process moves to step 430. In step 430, whether the image has the continuity in the direction of the focus detection pixel array near the position of the focus detection pixel, is checked by the parameter DCG. If there is a continuity in the direction of the focus detection pixel array (DCG=1), the process moves to step 460; otherwise, the process moves to step 450.

If there is no directionality of the image near the position of the focus detection pixel (DCG=0), that is, if the image is uniform or random near the position of the focus detection pixel, the pixels are compensated by averaging the pixel data of the imaging pixels near the focus detection pixel without depending on the directionality in step 440, and the averaged pixel data is used as the pixel data at the position of the focus detection pixel. For example, the compensated pixel data for the focus detection pixel G23 shown in FIGS. 15 and 16 is calculated as follows.

$$G23=(G12+G32+G14+G34)/4 \quad (48)$$

If there is a continuity in a direction other than the direction of the focus detection pixel array, that is, if there is a continuity in one of the directions indicated by DCG=2, 3 and 4 shown in FIG. 16, the pixel data is compensated by averaging the data of the imaging pixels near the focus detection pixel depending on the directionality in step 450, so that the averaged pixel data is used as the pixel data at the position of the focus detection pixel. For example, the compensated pixel data for the focus detection pixel G23 shown in FIGS. 15 and 16 is calculated as follows.

If there is a continuity in the direction at 45 degrees upward to the right (DCG=4), the pixel data of the green pixels near the position of the focus detection pixel in the direction of DCG=4 shown in FIG. 16 is averaged, and the averaged pixel data is used as the pixel data at the position of the focus detection pixel.

$$G23=(G14+G32)/2 \quad (49)$$

In addition, if there is a continuity of the image in the direction at 45 degrees upward to the left (DCG=3), the pixel data of the green pixels near the position of the focus detection pixel in the direction of DCG=3 shown in FIG. 16 is averaged, and the averaged pixel data is used as the pixel data at the position of the focus detection pixel.

$$G23=(G12+G34)/2 \quad (50)$$

Moreover, if there is a continuity of the image in the direction perpendicular to the direction of the focus detection pixel array (DCG=2), the pixel data of the green pixels near the position of the focus detection pixel in the direction of DCG=2 shown in FIG. 16 is averaged, and the averaged pixel data is used as the pixel data at the position of the focus detection pixel.

$$G23=(G21+G25)/2 \quad (51)$$

If the image has a continuity near the position of the focus detection pixel in the direction of the focus detection pixel array (DCG=1 in FIG. 16), because the image pixels do not exist in the direction of the focus detection pixel array from the position of the focus detection pixel as the base, the pixel data at the position of the focus detection pixel cannot be calculated by averaging the data of the pixels around the focus detection pixel in the direction of the array. Therefore, in the direction perpendicular to the direction of the focus detection pixel array (direction indicated by DCG=2 in FIG. 16), the image data at the position of the focus detection pixel is determined by interpolation based on the data of the imaging pixels sandwiching the focus detection pixel array. For example, using the values Gav1, Gav2, Gav3 and Gav4 determined from Equations (37), (39), (41) and (43), the compensated pixel data Gip0 is interpolated as follows.

$$Gip0=Gav2+Gav3-(Gav1+Gav4)/2 \quad (52)$$

Figure 17:
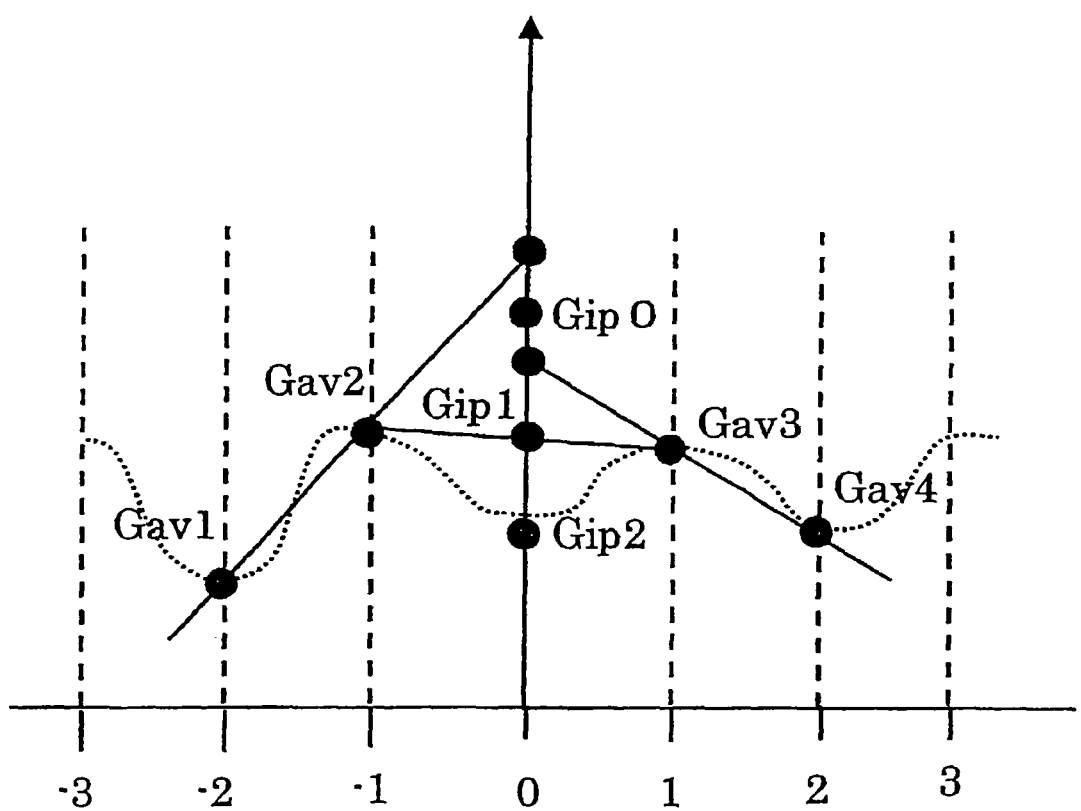
FIG. 17 is a figure in which the horizontal axis indicates pixel positions in a direction (column direction) perpendicular to the direction of the array of the focus detection, and the vertical axis indicates pixel data at the pixel positions.

In FIG. 17, the horizontal axis indicates a position of pixels in a direction (row direction) perpendicular to the focus detection pixel array, and the vertical axis indicates pixel data at the position of the pixels. The above Equation (52) means that the average of (i) pixel data on a line connecting two pixel data Gav1 and Gav2 located on one side of the focus detection pixel and extending to the position of the focus detection pixel and (ii) pixel data on a line connecting two pixel data Gav3 and Gav4 located on the other side of the focus detection pixel and extending to the position of the focus detection pixel, becomes compensated pixel data Gip0. Because effects of the high frequency component near the focus detection pixel is reflected to the value of the compensated pixel data by using such an interpolation process, excellent results can be obtained for images that contain a large volume of high frequency components, compared to a case in which the pixel data Gip1 obtained by simply averaging the pixel data Gav2 and Gav3 of the pixels adjacent to the position of the focus detection pixel, is used as the compensated pixel data.

However, if the image includes an extremely high spatial frequency component (a spatial frequency component near the Nyquist frequency in response to the pixel data pitch), there is a case where the value of the compensated pixel data has a significant error with respect to an ideal value of the pixel data in the interpolation process using Equation (52). In FIG. 17, the dotted line indicates a waveform of an image that includes a large amount of the Nyquist frequency components, and the pixel data Gip0 determined by the interpolation process is deviated from the proper value for the actual pixel data. To prevent such a problem, the pixel data for the focus detection pixel, to which the proper value for the actual pixel data is relatively reflected, is referenced.

Here, the value of the pixel data for the focus detection pixel is indicated by A23. The focus detection pixels have the spectral characteristics shown in FIG. 8. Because these spectral characteristics include spectral characteristics of the green, red and blue pixels, the pixel data A23 for the focus detection pixel is represented as follows.

$$A23=Ka\cdot(Ga+Ba+Ra) \quad (53)$$

In Equation (53), Ka represents a coefficient determined by dividing an area of the photoelectric converter of the focal detection pixel by an area of the photoelectric converter of the imaging pixel. Ga, Ba and Ra represent pixel data in a case where the green, blue and red pixels exist respectively at the positions of the focus detection pixels.

Here, assuming that the spatial distribution (output ratio of the green, red and blue pixels) of incident light at the position of the focus detection pixel and the spectral distribution (output ratio of the green, red and blue pixels) of the incident light near the position of the focus detection pixel are equal to each other, the ratios can be represented by the following equations.

$$Ba/Ga=(B11+B31+B15+B35)/(2\cdot(G21+G25)) \quad (54)$$

$$Ra/Ga=2\cdot(R22+R24)/(G12+G32+G14+G34) \quad (55)$$

By plugging Equations (54) and (55) into Equation (53) to solve for Ga and by setting as a conversion data Gip2 for the pixel data of a green pixel at a position of the focus detection pixel based on the pixel data of the focus detection pixel, the conversion data Gip2 is determined as follows.

$$Gip2=Ga=A23/(Ka\cdot(1+(B11+B31+B15+B35)/(2\cdot(G21+G25))+2\cdot(R22+R24)/(G12+G32+G14+G34)) \quad (56)$$

The last compensated pixel data G23 is determined as follows. If Gip0 and Gip2 are both greater or smaller than Gip1 (average value), $$G23=Gip0 \quad (57)$$

Otherwise, $$G23=Gip2 \quad (58)$$

By performing the above processes, a significant deviation of the compensated pixel data for the image containing a large number of high frequency components near the Nyquist frequency can be prevented.

In step 470, it is checked as to whether all of the designations for the focus detection pixels at positions where green pixels are to be placed among the focus detection pixels located on the row or column of G and B, have been completed. If the designations have not be completed, the process returns to step 310 to designate the next focus detection pixel. If the designations have been completed, the process moves to step 480 to perform the pixel compensation process for the focus detection pixels at a position where blue pixels are to be placed.

In step 480, of the focus detection pixels positioned in the row or column of G and B, each focus detection pixel at a position where the blue pixels are to be placed is subsequently designated. Here, the explanation is made assuming that the focus detection pixel at the position where B33 is to be output in FIG. 15 is designated. In step 490, the pixel data at the focus detection pixel is calculated based on a ratio of the pixel data of the blue pixels and the pixel data of the green pixels near the focus detection pixel, and the process advances to step 500.

The blue pixels have a lower density than the green pixels, and the pixel pitch of the blue pixels is twice as large as the pixel pitch of the green pixels. The pixel data of the blue pixels at the position of the focus detection pixel may be compensated by a method similar to that used for the green pixels. However, because the Nyquist frequency for the blue pixels becomes a half of the Nyquist frequency for the green pixels, the compensation accuracy for the blue pixels decreases compared to the accuracy for the green pixels if the image contains a large number of high frequency components, and the ratio with the data for the surrounding green pixels may become inconsistent, thereby causing the color to be varied. Because, based on visual acuity of humans, the user does not perceive awkwardness if the color (ratio of the blue pixel data and the green pixel data) matches with surroundings, when performing the compensation of the blue pixel data, such compensation is made so as to match with the surrounding color.

For example, assuming that the ratio of the pixel data of the blue pixel at the position of the focus detection pixel and the pixel data of the surrounding green pixels is equal to the ratio of the pixel data of the blue pixels near the position of the focus detection pixel and the pixel data of the surrounding green pixels, compensation pixel data B33 is calculated as follows.

$$B33/(G23+G32+G34+G43)=((B31/(G21+G30+G32+G41))+(B35/(G25+G34+G36+G45)))/2 \quad (59)$$

By solving Equation (58), the compensation pixel data B33 is calculated.

$$B33=(G23+G32+G34+G43)\cdot((B31/(G21+G30+G32+G41))+(B35/(G25+G34+G36+G45)))/2 \quad (60)$$

In step 500, it is checked as to whether all of the designations of the focus detection pixels located at the proper position for the blue pixels, among the focus detection pixels located in the row or column of GB, have been completed. If the designations have not been completed, the process returns to step 480 to designate the next focus detection pixel. If the designations have been completed, the process ends the pixel compensation process in step 501.

In the above-discussed embodiment, because the pixel compensation process is changed depending on the direction of the image continuity, an excellent pixel compensation process can be performed even when an image having directionality, such as an edge or line pattern, is superimposed on the array of focus detection pixels, compared to the pixel compensation processes using only a simple averaging process.

Moreover, when compensating the pixel data for the green pixels with a high pixel density, an accurate pixel compensation can be achieve by detecting the direction of image continuity and performing the pixel compensation process in response to the detected direction of continuity. When compensating the pixel data for the blue pixels with low pixel density, the blue pixel data is compensated so that the color is matched with respect to the pixel data for green pixels with the high pixel density, thereby preventing color variation due to compensation error.

Further, the pixel compensation process (averaging process in response to the direction) used when the direction of the focus detection pixel array and the direction of the image continuity match with each other is differed from the image compensation process (averaging process in response to the direction) used when the image continuity is in a different direction. Therefore, highly accurate pixel compensation data (compensated pixel data) can be obtained, regardless of the relationship between the direction of the focus detection pixel array and the direction of the image continuity.

In the pixel compensation process for a case where the direction of the focus detection pixel array and the direction of the image continuity match with each other, the final compensation data is determined by comparing the compensated data obtained by the interpolation process and the conversion data obtained based on the pixel data of the focus detection pixel. Therefore, compensation errors caused by the interpolation process can be prevented even when the image includes high frequency components near the Nyquist frequency.

Furthermore, when the image near the position of the focus detection pixel is uniform or random, the pixel compensation is performed using a simple averaging process. Therefore, the calculation process is simplified, and thus, the calculation time is shortened.

In the operation of the embodiment shown in FIG. 14, the detection of image continuity in the direction of the focus detection pixel array (step 400) is performed after the detection of the image continuity in the direction perpendicular to the focus detection pixel array (step 380). As a result, the detection of image continuity in the direction of the focus detection pixel array is prioritized. Therefore, even when an edge pattern or a line pattern is superimposed on the focus detection pixel array, the pixel compensation process in the direction of the focus detection pixel array can be performed accurately.

Other Embodiments

In steps 330, 340, 360, 380 and 400 for the operation of the embodiment shown in FIG. 14, the range of the pixel data for the imaging pixels used in the equations for judging the image uniformity and continuity is not limited to the range of the above-discussed equations. The range can be arbitrarily selected depending on the condition.

In step 460 shown in FIG. 14, because the compensation error becomes larger if the pixel data Gip0 determined by the interpolation process is used when the image includes an extremely high spatial frequency component (a spatial frequency component near the Nyquist frequency in response to the pixel data pitch), the conversion data Gip2 determined based on the pixel data of the focus detection pixel and the pixel data Gip0 are compared with the average data Gip1. If both Gip0 and Gip2 are greater or smaller than Gip1 (average value), G23=Gip0; otherwise G23=Gip2. However, otherwise it is possible to set G23=Gip1 or G23=(Gip2+Gip0)/2.

Furthermore, to detect that the image includes the extremely high spatial component (a spatial frequency component near the Nyquist frequency in response to the pixel data pitch), an array of the pixel data may be Fourier-transformed to directly detect the distribution of the spatial frequencies for the image. Based on the results, G23 may be set to Gip2 (G23=Gip2) if there is a high number of high frequency components; otherwise G23 may be set to Gip0 (G23=Gip0).

In step 460 shown in FIG. 14, it is judged whether the pixel data Gip0 determined by the interpolation process is to be used in response to the conversion data Gip2 obtained based on the pixel data of the focus detection pixel. However, upper and lower values of the compensated pixel data determined by the averaging process or the compensated pixel data determined by the interpolation process may be limited depending on the data obtained by multiplying the conversion pixel data Gip2 by a predetermined coefficient. For example, if the value of the compensation pixel data exceeds twice the conversion pixel data, the value of the compensated pixel data may be clipped to a value that is equal to twice the conversion pixel data. By doing so, the error in the compensated pixel data can be prevented from being extremely large.

In step 460 for the operation of the embodiment shown in FIG. 1, to determine the conversion data Gip2 based on the pixel data of the focus detection pixel, value A23 for the pixel data of the focus detection pixel at its position is used. However, because image shift occurs when the defocus amount is large, there is a difference with the conversion data in a case where there is an imaging pixel without a color filter at that position. Thus, to cancel out the effects by the image shift due to the defocusing, A23/2+(A13+A33)/4 may be used instead of A23. Here, A13 and A33 are pixel data of the focus detection pixels adjacent to the designated focus detection pixel (the base focus detection pixel). As a result, the data of the image-shifted pixels is averaged even if image shift due to defocusing occurs, and the above-discussed difference can be minimized. In addition, a range of the focus detection pixels used for the averaging may be changed depending on the size of the defocus amount, and the data may be averaged using such a range of focus detection pixels.

In step 460 for the operation of the embodiment shown in FIG. 14, to determine the conversion data Gip2 based on the pixel data of the focus detection pixel, the value A23 for the pixel data of the focus detection pixel at its position is used. However, because the ratio of the pixel data of the focus detection pixel and the pixel data of the imaging pixel that is supposed to be at that position varies depending on the diaphragm stop amount, the pixel data of the focus detection pixel may be used by converting the pixel data depending on the diaphragm stop amount.

In the operation of the embodiment shown in FIG. 14, the detection of the image continuity in the direction of the focus detection pixel array (step 400) is performed after the detection of the image continuity in a direction perpendicular to the direction of the focus detection pixel array (step 380). As a result, the detection of the image continuity in the direction of the focus detection pixel array is prioritized. However, in a state where the image continuity in the direction perpendicular to the direction of the focus detection pixel array is detected (DCG=2) in step 380, if the image continuity in the direction of the focus detection pixel array is not detected, it may be processed such that the directionality does not exist (DCG=0) as the image may be recognized as a grid pattern or a random pattern, and the process may move to step 420.

In the above-described embodiment, the method for the averaging process for the surrounding pixel data is changed depending on the image uniformity and the direction of the image continuity near the focus detection pixel array. However, the distribution of the spatial frequency components near the focus detection pixel array may be calculated for a plurality of directions, and the method for the averaging process may be changed in response to the calculation result. For example, a simple averaging process may be performed when the high frequency components are few in all directions, and when the high frequency components are large in a specific direction, an averaging process that averages the pixel data in a direction perpendicular to such a specific direction may be performed. Moreover, when there is a high number of low frequency components, the averaging process may be performed on the pixel data in a relatively wide range, and if there is a high number of the high frequency components, the averaging process may be performed on the pixel data in a relatively narrow range.

In the above-described embodiment, the explanations are made with an example that the focus detection pixel array exists linearly (one dimensionally) within a two dimensional arrangement of the imaging pixels. However, this invention is not limited to this. The above-discussed pixel data compensation method can be widely used in a situation where an array of pixels that cannot be directly used for imaging (e.g., defective pixels) exists in the two dimensional arrangement of the imaging pixels.

The arrangement of the focus detection area for the imaging elements is not limited to the position in the embodiment shown in FIG. 2. The focus detection area may be positioned in the diagonal direction or in horizontal and vertical directions or other positions.

Figure 18:
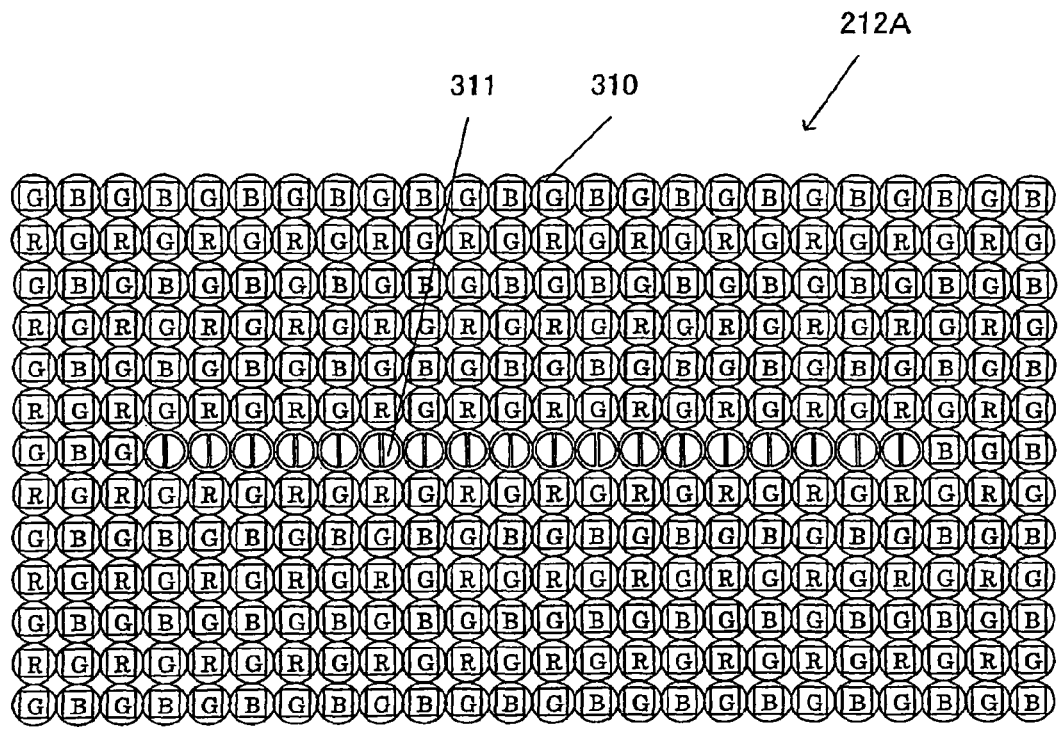
FIG. 18 is a front view of a modified imaging element.

In the imaging element 212 shown in FIG. 3, the focus detection pixels 313, 314, 315 and 316, each include one photoelectric converter therein. However, similar to an imaging element 212A as a modified example as shown in FIG. 18, focus detection pixels equipped with a pair of photoelectric converters within a single pixel may be used. In FIG. 18, the focus detection pixel 311 is equipped with a pair of the photoelectric converters within a single pixel. The focus detection element 313 functions as the pair consisting of the focus detection pixels 313 and 314 of the imaging element 212.

Figure 19:
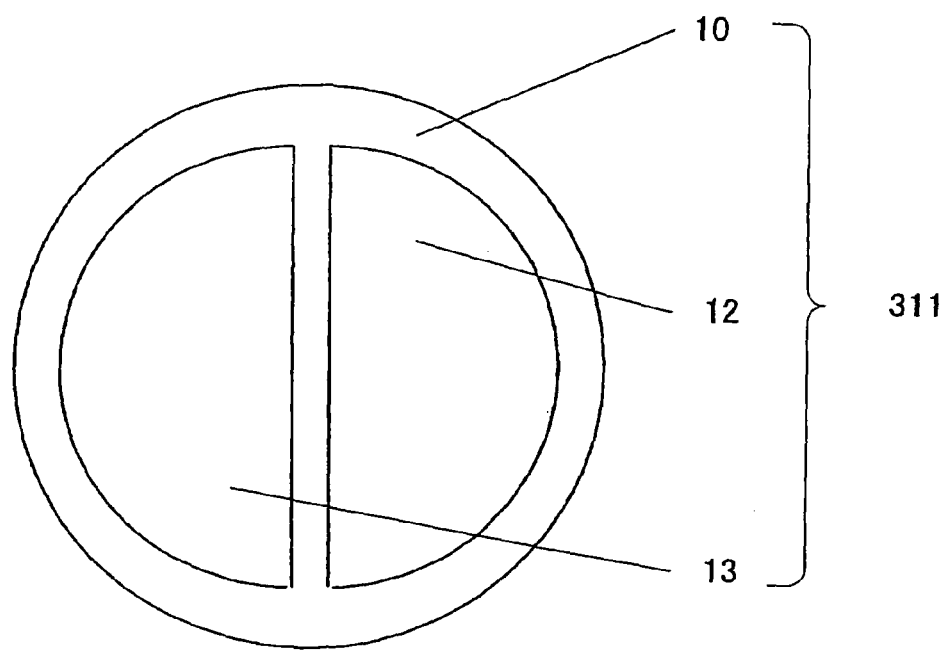
FIG. 19 is a front view of the focus detection pixel used in the modified imaging element shown in FIG. 18.

As shown in FIG. 19, the focus detection pixel 311 includes a micro lens 10 and a pair of photoelectric converters 12 and 13. In the focus detection pixel 311, a color filter is not provided to obtain additional light amount. The spectral characteristic is a total of the spectral sensitivity of a photodiode performing the photoelectric conversion and spectral characteristics of an infrared cut filter (not shown) (FIG. 8), and is the addition of the spectral characteristics of the green, red and blue pixels shown in FIG. 7. The range of the optical wavelengths for its sensitivity is the inclusion of the ranges of optical wavelengths for the sensitivity of the green, red and blue pixels.

The imaging element 212 shown in FIG. 3, for example, is included with a Bayer-arranged color filters. However, the structure and/or the arrangement of the color filters is not limited to this, and an arrangement of filters of supplemental colors (green: G, yellow: Ye, magenta: Mg, cyan: cy) may be used.

In the imaging element shown in FIG. 3, the focus detection pixels are not equipped with a color filter. However, the present invention can be achieved in a case where the focus detection pixels are equipped with a filter for a color that is the same as the imaging pixels (e.g., a green filter).

In FIGS. 5 and 18, the shape of the photoelectric converters of the focus detection pixels is exemplarily made in a semicircular shape. However, the shape of the photoelectric converters are not limited to the shape of the embodiments but may be in a different shape. For example, it is possible to make the shape of the photoelectric converters of the focus detection pixels in a rectangular or polygonal shape.

In the imaging element 212 shown in FIG. 3, the imaging pixels and the focus detection pixels are, for example, arranged in a dense square lattice manner. However, the arrangement may be a dense hexagonal lattice.

The imaging apparatus of the present invention is not limited to a digital still camera or a film still camera structured from an interchangeable lens and a camera body. However, this invention may be used in a digital still camera and film still camera with an integral lens, and in a video camera. Moreover, this invention may be used for a small size camera module in a cellular phone, a disposable camera, and a visual recognition device for robots. Further, the invention may be used in a focus detection device, a range finding device and a stereo range finding device in a device other than cameras.

What is claimed is:

1. An imaging apparatus comprising:
    an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
    continuity detection means for detecting whether a continuity of the pixel signals exists in at least one predetermined direction based on the pixel signals of the imaging pixels arranged around the non-imaging pixels; and
    calculation means for determining a pixel signal at a position of the non-imaging pixels by processing a pixel output of the imaging pixels arranged around the non-imaging pixels and based on whether any continuity was detected in the at least one predetermined direction, wherein
    the imaging pixels are arranged such that imaging pixels of a plurality of types having different spectral characteristics are arranged with different densities; and
    the calculation means performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types.

2. The imaging apparatus according to claim 1, wherein the calculation of the pixel signals for the non-imaging pixels provided at the position of the imaging pixels arranged at the relatively high density in the imaging pixels of the plurality of types is a process that includes averaging the pixel signals output from the imaging pixels arranged at the relatively high density around the non-imaging pixels.

3. The imaging apparatus according to claim 1, wherein the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

4. An imaging apparatus comprising:
    an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
    continuity detection means for detecting whether a continuity of the pixel signals exists in at least one predetermined direction based on the pixel signals of the imaging pixels arranged around the non-imaging pixels;
    calculation means for determining a pixel signal at a position of the non-imaging pixels by processing a pixel output of the imaging pixels arranged around the non-imaging pixels and based on whether any continuity was detected in the at least one predetermined direction;
    presumption means for presuming the pixel signals at the position of the non-imaging pixels based on a spectral distribution of incident light in a proximity of the non-imaging pixels;
    averaging means for calculating the pixel signals at the position of the non-imaging pixels by statistically averaging the pixel signals of the imaging pixels around the non-imaging pixels; and
    selection means for comparing the pixel signals calculated by the calculation means and the pixel signals presumed by the presumption means based on the pixel signals calculated by the calculation means, and selecting as final pixels one of the pixel signals calculated by the calculation means and the pixel signals presumed by the presumption means.

5. An imaging apparatus comprising:
an imaging element having two-dimensionally arranged imaging pixels that receive light of an image fanned by an optical system and output pixel signals corresponding to the received light, and in which non-imaging pixels, different from the imaging pixels, are arranged amongst the imaging pixels;
continuity detection means for detecting whether a continuity of the pixel signals exists in at least one predetermined direction based on the pixel signals of the imaging pixels arranged around the non-imaging pixels;
calculation means for determining a pixel signal at a position of the non-imaging pixels by processing a pixel output of the imaging pixels arranged around the non-imaging pixels and based on whether any continuity was detected in the at least one predetermined direction;
determination means for determining whether there is uniformity in the image around the non-imaging pixels, based on the pixel signals of the imaging pixels around the non-imaging pixels;
averaging means for calculating the pixel signals at the position of the imaging pixels by statistically averaging the pixel signals of the imaging pixels around the non-imaging pixels; and
decision means for deciding the pixel signals calculated by the averaging means as the final pixel signals at the position of the non-imaging pixels if the uniformity is determined by the determination means.

6. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels; and
a processor that (i) determines whether a continuity of the pixel signals exists in at least one predetermined direction based on the pixel signals of the imaging pixels arranged around the non-imaging pixels, and (ii) calculates pixel signals at positions of the non-imaging pixels by processing a pixel output of the imaging pixels arranged around the non-imaging pixels and based on whether any continuity was determined to exist in the at least one predetermined direction, wherein
the imaging pixels are arranged such that imaging pixels of a plurality of types having different spectral characteristics are arranged with different densities; and
the processor performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types.

7. The imaging apparatus according to claim 6, wherein the calculation of the pixel signals for the non-imaging pixels provided at the position of the imaging pixels arranged at the relatively high density in the imaging pixels of the plurality of types is a process that includes averaging the pixel signals output from the imaging pixels arranged at the relatively high density around the non-imaging pixels.

8. The imaging apparatus according to claim 6, wherein the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

9. An imaging apparatus comprising;
an imaging element having two-dimensionally arranged imaging pixels that receive light of an image formed by an optical system and output pixel signals corresponding to the received light, and in which non-imaging pixels, different from the imaging pixels, are arranged amongst the imaging pixels; and
a processor that (i) determines whether a continuity of the pixel signals exists in at least one predetermined direction based on the pixel signals of the imaging pixels arranged around the non-imaging pixels, and (ii) calculates pixel signals at positions of the non-imaging pixels by processing a pixel output of the imaging pixels arranged around the non-imaging pixels and based on whether any continuity was determined to exist in the at least one predetermined direction, wherein
the processor (iii) presumes the pixel signals at the position of the non-imaging pixels based on a spectral distribution of incident light in a proximity of the non-imaging pixels, (iv) calculates the pixel signals at the position of the non-imaging pixels by statistically averaging the pixel signals of the imaging pixels around the non-imaging pixels, (v) compares the calculated pixel signals and the presumed pixel signals, and (vi) selects as final pixels one of the calculated pixel signals and the presumed pixel signals.

10. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels; and
a processor that (i) determines whether a continuity of the pixel signals exists in at least one predetermined direction based on the pixel signals of the imaging pixels arranged around the non-imaging pixels, and (ii) calculates pixel signals at positions of the non-imaging pixels by processing a pixel output of the imaging pixels arranged around the non-imaging pixels and based on whether any continuity was determined to exist in the at least one predetermined direction, wherein
the processor (iii) determines whether there is uniformity in the image around the non-imaging pixels, based on the pixel signals of the imaging pixels around the non-imaging pixels, (iv) calculates the pixel signals at the positions of the imaging pixels by statistically averaging the pixel signals of the imaging pixels around the non-imaging pixels, and (v) decides the calculated pixel signals to be the final pixel signals at the position of the non-imaging pixels if the uniformity is determined.

11. An imaging method using an imaging element having two-dimensionally arranged imaging pixels that receive light of an image formed by an optical system and output pixel signals corresponding to the received light, and in which non-imaging pixels, different from the imaging pixels, are arranged amongst the imaging pixels, the method comprising:
determining by a processor pixel signals at positions of the non-imaging pixels by detecting whether a continuity of the pixel signals exists in at least one predetermined direction based on the pixel signals of the imaging pixels arranged around the non-imaging pixels and by processing the pixel signals of the imaging pixels arranged around the non-imaging pixels and based on whether any continuity was detected to exist in the at least one predetermined direction, wherein the imaging pixels are arranged such that imaging pixels of a plurality of types having different spectral characteristics are arranged with different densities; and the determining step performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types.

12. The method according to claim 11, wherein the calculation of the pixel signals for the non-imaging pixels provided at the position of the imaging pixels arranged at the relatively high density in the imaging pixels of the plurality of types is a process that includes averaging the pixel signals output from the imaging pixels arranged at the relatively high density around the non-imaging pixels.

13. The method according to claim 11, wherein the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

14. An imaging method using an imaging element having two-dimensionally arranged imaging pixels that receive light of an image formed by an optical system and output pixel signals corresponding to the received light, and in which non-imaging pixels, different from the imaging pixels, are arranged amongst the imaging pixels, the method comprising:

determining by a processor pixel signals at positions of the non-imaging pixels by detecting whether a continuity of the pixel signals exists in at least one predetermined direction based on the pixel signals of the imaging pixels arranged around the non-imaging pixels, and by processing the pixel signals of the imaging pixels arranged around the non-imaging pixels and based on whether any continuity was detected to exist in the at least one predetermined direction, wherein the determining step includes (i) presuming the pixel signals at the position of the non-imaging pixels based on a spectral distribution of incident light in a proximity of the non-imaging pixels, (ii) calculating the pixel signals at the position of the non-imaging pixels by statistically averaging the pixel signals of the imaging pixels around the non-imaging pixels, (iii) comparing the calculated pixel signals and the presumed pixel signals, and (iv) selecting as final pixels one of the calculated pixel signals and the presumed pixel signals.

15. An imaging method using an imaging element having two-dimensionally arranged imaging pixels that receive light of an image formed by an optical system and output pixel signals corresponding to the received light, and in which non-imaging pixels, different from the imaging pixels, are arranged amongst the imaging pixels, the method comprising:

determining by a processor pixel signals at positions of the non-imaging pixels by detecting whether a continuity of the pixel signals exists in at least one predetermined direction based on the pixel signals of the imaging pixels arranged around the non-imaging pixels, and by processing the pixel signals of the imaging pixels arranged around the non-imaging pixels and based on whether any continuity was detected to exist in the at least one predetermined direction, wherein the determining step includes (i) determining whether there is uniformity in the image around the non-imaging pixels, based on the pixel signals of the imaging pixels around the non-imaging pixels, (ii) calculating the pixel signals at the positions of the imaging pixels by statistically averaging the pixel signals of the imaging pixels around the non-imaging pixels, and (iii) deciding the calculated pixel signals to be the final pixel signals at the position of the non-imaging pixels if the uniformity is determined.

16. An imaging apparatus comprising:

an imaging element having two-dimensionally arranged imaging pixels that receive light of an image formed by an optical system and output pixel signals corresponding to the received light, and in which non-imaging pixels, different from the imaging pixels, are arranged linearly in a predetermined direction amongst the imaging pixels;

a continuity detection unit that detects an image continuity in the predetermined direction, of an image at a position of the non-imaging pixels based on the pixel signals of the imaging pixels arranged around the non-imaging pixels; and a calculation unit that determines a pixel signal at the position of the non-imaging pixels by processing the pixel signals of the imaging pixels sandwiching a non-imaging pixel array of the non-imaging pixels in the predetermined direction if the image continuity in the predetermined direction is detected by the continuity detection unit, wherein the imaging pixels are arranged in a plurality of imaging pixel arrays including a first imaging pixel array and a second imaging pixel array on one side of the non-imaging pixel array and a third imaging pixel array and a fourth imaging pixel array on another side of the non-imaging pixel array;

the first imaging pixel array is adjacent to and parallel to the non-imaging pixel array;

the second imaging pixel array is adjacent to and parallel to the first imaging pixel array;

the third imaging pixel array is adjacent to and parallel to the non-imaging pixel array;

the fourth imaging pixel array is adjacent to and parallel to the third imaging pixel array; and the calculation unit processes the pixel signals of the imaging pixels sandwiching the non-imaging pixel array by calculating an average of the pixel signals of the imaging pixels near each of the non-imaging pixels arranged in the first imaging pixel array, an average of the pixel signals of the imaging pixels near the each of the non-imaging pixels arranged in the second imaging pixel array, an average of the pixel signals of the imaging pixels near the each of the non-imaging pixels arranged in the third imaging pixel array and an average of the pixel signals of the imaging pixels near the each of the non-imaging pixels arranged in the fourth imaging pixel array.

17. An imaging apparatus comprising:

an imaging element having two-dimensionally arranged imaging pixels that receive light of an image formed by an optical system and output pixel signals corresponding to the received light, and in which non-imaging pixels, different from the imaging pixels, are arranged amongst the imaging pixels;

continuity detection means for detecting a direction of continuity of the pixel signals based on the pixel signals of the imaging pixels arranged around the non-imaging pixels; and calculation means for determining a pixel signal at a position of the non-imaging pixels by processing the pixel output of the imaging pixels arranged around the non-imaging pixels in response to the detected direction of continuity, wherein:

the imaging pixels are arranged such that imaging pixels of a plurality of types having different spectral characteristics are arranged with different densities;

the calculation means performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types; and the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

18. An imaging apparatus comprising:

an imaging element having two-dimensionally arranged imaging pixels that receive light of an image fowled by an optical system and output pixel signals corresponding to the received light, and in which non-imaging pixels, different from the imaging pixels, are arranged amongst the imaging pixels;

continuity detection means for detecting a direction of continuity of the pixel signals based on the pixel signals of the imaging pixels arranged around the non-imaging pixels; and calculation means for determining a pixel signal at a position of the non-imaging pixels by processing the pixel output of the imaging pixels arranged around the non-imaging pixels in response to the detected direction of continuity, further comprising:

presumption means for presuming the pixel signals at the position of the non-imaging pixels based on a spectral distribution of incident light in a proximity of the non-imaging pixels;

averaging means for calculating the pixel signals at the position of the non-imaging pixels by statistically averaging the pixel signals of the imaging pixels around the non-imaging pixels; and selection means for comparing the pixel signals calculated by the calculation means and the pixel signals presumed by the presumption means based on the pixel signals calculated by the calculation means, and selecting as final pixels one of the pixel signals calculated by the calculation means and the pixel signals presumed by the presumption means.

19. An imaging apparatus comprising:

an imaging element having two-dimensionally arranged imaging pixels that receive light of an image formed by an optical system and output pixel signals corresponding to the received light, and in which non-imaging pixels, different from the imaging pixels, are arranged amongst the imaging pixels;

continuity detection means for detecting a direction of continuity of the pixel signals based on the pixel signals of the imaging pixels arranged around the non-imaging pixels; and calculation means for determining a pixel signal at a position of the non-imaging pixels by processing the pixel output of the imaging pixels arranged around the non-imaging pixels in response to the detected direction of continuity, further comprising:

determination means for determining whether there is uniformity in the image around the non-imaging pixels, based on the pixel signals of the imaging pixels around the non-imaging pixels;

averaging means for calculating the pixel signals at the position of the imaging pixels by statistically averaging the pixel signals of the imaging pixels around the non-imaging pixels; and decision means for deciding the pixel signals calculated by the averaging means as the final pixel signals at the position of the non-imaging pixels if the uniformity is determined by the determination means.

20. An imaging apparatus comprising:

an imaging element having two-dimensionally arranged imaging pixels that receive light of an image formed by an optical system and output pixel signals corresponding to the received light, and in which non-imaging pixels, different from the imaging pixels, are arranged amongst the imaging pixels;

a continuity detection unit that detects whether a continuity of the pixel signals exists in at least one predetermined direction based on the pixel signals of the imaging pixels arranged around the non-imaging pixels; and a calculation unit that determines a pixel signal at a position of the non-imaging pixels by processing a pixel output of the imaging pixels arranged around the non-imaging pixels and based on whether any continuity was detected in the at least one predetermined direction, wherein the imaging pixels are arranged such that imaging pixels of a plurality of types having different spectral characteristics are arranged with different densities; and the calculation unit performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types.

21. The imaging apparatus according to claim 20, wherein the calculation of the pixel signals for the non-imaging pixels provided at the position of the imaging pixels arranged at the relatively high density in the imaging pixels of the plurality of types is a process that includes averaging the pixel signals output from the imaging pixels arranged at the relatively high density around the non-imaging pixels.

22. The imaging apparatus according to claim 20, wherein the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

23. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
a continuity detection unit that detects whether a continuity of the pixel signals exists in at least one predetermined direction based on the pixel signals of the imaging pixels arranged around the non-imaging pixels;
a calculation unit that determines a pixel signal at a position of the non-imaging pixels by processing a pixel output of the imaging pixels arranged around the non-imaging pixels and based on whether any continuity was detected in the at least one predetermined direction;
a presumption unit that presumes the pixel signals at the position of the non-imaging pixels based on a spectral distribution of incident light in a proximity of the non-imaging pixels;
an averaging unit that calculates the pixel signals at the position of the non-imaging pixels by statistically averaging the pixel signals of the imaging pixels around the non-imaging pixels; and
a selection unit that compares the pixel signals calculated by the calculation unit and the pixel signals presumed by the presumption unit based on the pixel signals calculated by the calculation unit, and selecting as final pixels one of the pixel signals calculated by the calculation unit and the pixel signals presumed by the presumption unit.

24. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
a continuity detection unit that detects whether a continuity of the pixel signals exists in at least one predetermined direction based on the pixel signals of the imaging pixels arranged around the non-imaging pixels;
a calculation unit that determines a pixel signal at a position of the non-imaging pixels by processing a pixel output of the imaging pixels arranged around the non-imaging pixels and based on whether any continuity was detected in the at least one predetermined direction;
a determination unit that determines whether there is uniformity in the image around the non-imaging pixels, based on the pixel signals of the imaging pixels around the non-imaging pixels;
an averaging unit that calculates the pixel signals at the position of the imaging pixels by statistically averaging the pixel signals of the imaging pixels around the non-imaging pixels; and
a decision unit that decides the pixel signals calculated by the averaging unit as the final pixel signals at the position of the non-imaging pixels if the uniformity is determined by the determination unit.

25. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
a continuity detection unit that detects a direction of continuity of the pixel signals based on the pixel signals of the imaging pixels arranged around the non-imaging pixels; and
a calculation unit that determines a pixel signal at a position of the non-imaging pixels by processing the pixel output of the imaging pixels arranged around the non-imaging pixels in response to the detected direction of continuity, wherein:
the imaging pixels are arranged such that imaging pixels of a plurality of types having different spectral characteristics are arranged with different densities;
the calculation unit performs by different processes, a calculation of the pixel signals for the non-imaging pixels provided at a position of the imaging pixels arranged at a relatively high density in the imaging pixels of the plurality of types, and a calculation of the pixels signals for the non-imaging pixels provided at a position of the imaging pixels arranged at a relatively low density in the imaging pixels of the plurality of types; and
the calculation of the pixel signals for the non-imaging pixels provided at the position of the imaging pixels at the relatively low density in the imaging pixels of the plurality of types is a process that includes generating a ratio of (i) the pixel signals of the imaging pixels arranged at the relatively high density around the non-imaging pixels and (ii) the pixel signals of the imaging pixels arranged at the relatively low density.

26. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels;
a continuity detection unit that detects a direction of continuity of the pixel signals based on the pixel signals of the imaging pixels arranged around the non-imaging pixels; and
a calculation unit that determines a pixel signal at a position of the non-imaging pixels by processing the pixel output of the imaging pixels arranged around the non-imaging pixels in response to the detected direction of continuity, further comprising:
a presumption unit that presumes the pixel signals at the position of the non-imaging pixels based on a spectral distribution of incident light in a proximity of the non-imaging pixels;
an averaging unit that calculates the pixel signals at the position of the non-imaging pixels by statistically averaging the pixel signals of the imaging pixels around the non-imaging pixels; and
a selection unit that compares the pixel signals calculated by the calculation unit and the pixel signals presumed by the presumption unit based on the pixel signals calculated by the calculation unit, and selecting as final pixels one of the pixel signals calculated by the calculation unit and the pixel signals presumed by the presumption unit.

27. An imaging apparatus comprising:
an imaging element having two-dimensionally arranged imaging pixels that receive light of an image formed by an optical system and output pixel signals corresponding to the received light, and in which non-imaging pixels, different from the imaging pixels, are arranged amongst the imaging pixels;

a continuity detection unit that detects a direction of continuity of the pixel signals based on the pixel signals of the imaging pixels arranged around the non-imaging pixels; and a calculation unit that determines a pixel signal at a position of the non-imaging pixels by processing the pixel output of the imaging pixels arranged around the non-imaging pixels in response to the detected direction of continuity, further comprising:

a determination unit that determines whether there is uniformity in the image around the non-imaging pixels, based on the pixel signals of the imaging pixels around the non-imaging pixels;

an averaging unit that calculates the pixel signals at the position of the imaging pixels by statistically averaging the pixel signals of the imaging pixels around the non-imaging pixels; and a decision unit that decides the pixel signals calculated by the averaging unit as the final pixel signals at the position of the non-imaging pixels if the uniformity is determined by the determination unit.

\* \* \* \* \*